United States Patent [19]

Guilino et al.

[11] Patent Number: 5,148,205
[45] Date of Patent: Sep. 15, 1992

[54] OPHTHALMIC LENS HAVING A CHANGING REFRACTIVE INDEX

[75] Inventors: Günther Guilino; Helmut Altheimer; Herbert Pfeiffer, all of München, Fed. Rep. of Germany

[73] Assignee: Optische Werke G. Rodenstock, Fed. Rep. of Germany

[21] Appl. No.: 490,700

[22] PCT Filed: Jun. 22, 1989

[86] PCT No.: PCT/DE89/00410
§ 371 Date: Feb. 22, 1990
§ 102(e) Date: Feb. 22, 1990

[87] PCT Pub. No.: WO89/12841
PCT Pub. Date: Dec. 28, 1989

[30] Foreign Application Priority Data
Jun. 22, 1988 [DE] Fed. Rep. of Germany ....... 3821079
Jan. 21, 1989 [DE] Fed. Rep. of Germany ....... 3901775

[51] Int. Cl.$^5$ .............................. G02C 7/02

[52] U.S. Cl. .................... 351/159; 351/176; 359/652

[58] Field of Search ............... 351/159, 176; 350/913; 359/652

[56] References Cited
U.S. PATENT DOCUMENTS
3,486,808 12/1969 Hamblen ......................... 350/413

Primary Examiner—Scott J. Sugarman
Attorney, Agent, or Firm—Antonelli, Terry, Stout & Kraus

[57] ABSTRACT

An ophthalmic lens having a front and an eye-facing boundary surface and a varying refractive index, which contributes to the correction of aberrations. The ophthalmic lens is distinguished by having at least one system of surfaces at given level ($n(x,y,z)$=const.) with a constant refractive index, which are spaced the same distance at all points in the direction of their surface normals (parallel surfaces), and which, respectively their extension, intersect the axis connecting the lens apexes of the front surface and the eye-facing surface.

21 Claims, 23 Drawing Sheets

OPHTHALMIC LENS HAVING A CHANGING REFRACTIVE INDEX

FIELD OF THE INVENTION

The present invention relates to an ophthalmic lens having two boundary surfaces and a changing refractive index, which contributes to the correction of aberrations.

DESCRIPTION OF THE PRIOR ART

Ophthalmic lenses having a changing refractive index have frequently been dealt with in the literature in the field. With regard thereto, reference is made, by way of illustration, to the survey "Gradient Index Optics" by W. N. Charman (*The Ophthalmic Optician*, 1981, pp. 73-84) including the literature cited therein or DE-OS 27 07 601.

Essentially, this literature discusses the substitution of an "index gradient" for aspherical surfaces or further improvement of the imaging properties of ophthalmic lenses with aspherical surfaces by means of an index gradient, with DE-OS 36 16 888 proposing for the first time the use of a changing refractive index to reduce the critical thickness substantially more than is possible with just the use of aspherical surfaces. (The critical thickness is the center thickness in ophthalmic lenses having positive refracting power and the peripheral thickness in ophthalmic lenses having negative refracting power.)

Express reference is made to the afore-mentioned publication with regard to all terms not explained in more detail herein and with regard to the calculation and optimization process.

In general, DE OS 36 16 888 considers the refractive indices changing rotationally symmetrically about the optical axis. The radially dependent gradient employed, in particular, in the preferred embodiments of DE-OS 36 16 888 is, however, relatively complicated to produce, by way of illustration, by means of "twisting" and subsequent thermal treatment of concentric cylinders, respectively hollow cylinders having differing refractive indices.

On the other hand, refractive index variations can be produced relatively easily by means of an ion exchanger bath, into which a glass block, respectively a plastic block, is immersed. The exchange of ions in the bath results in the development of a so-called "surface normal" gradient. However, a "normal" gradient, i.e. a perdendicular one, only has—as was understood in accordance with the present invention —little optical power. Although refractive indices with a radial course can theoretically be produced by means of "ion exchange" via the cylindrical surface of a very long glass cyclinder, in practice, for ophthalmic lenses, it is only possible with a few types of glass due to the usually very shallow penetration of the ion exchange effect.

SUMMARY

The object of the present invention is to provide an ophthalmic lens having a changing refractive index, the course of which is adapted to the respective problem and a process of fabricating the same, which permits flexible adaptation of the variation of the refractive index yielded by the selected process for producing the index gradient to the respective optical problem and, in particular, to the object of correction.

A solution to the aforegoing object and its further embodiments is set forth in the patent claims hereto.

The following root ideas form the basis for arriving at the aforegoing solution in accordance with the present invention:

An element of the present invention is that it was understood that a normal gradient for a surface, i.e., the front surface or the surface facing the eye of the "finished" opthalmic lens, thus e.g. a gradient course like the one yielded by an ion exchange process, only exercises minor influence on the correction of aberrations with penetration depths typical of these processes.

In particular, in an ophthalmic lens, whose more curved surface was selected without taking the correction of aberrations into consideration - like, by way of illustration, suggested in DE-OS 36 16 888, the aberrations cannot be corrected by means of a gradient, which is perpendicular to the surface facing the eye and/or the front surface of the ophthalmic lens.

On the other hand, a gradient according to the present invention, i.e. a refractive index variation, which depends on both the coordinate z lying in the direction of connecting axis of the apex of the lens and the coordinates x,y being perpendicular to the connecting axis, permits correcting aberrations and minimizing the critical thickness in a very simple manner. Another element of the present invention is that the ophthalmic lens is distinguished by having at least one system of surfaces at given levels ($n(x,y,z)$=const.) with a constant refractive index, always being spaced the same distance at all points in the direction of their surface normals (parallel surfaces), and which, respectively, their (analytical) extension, intersect the axis connecting the apex of the lens of the front surface and the surface facing the eye at a distance A from the next lens apex, for which $$A \leq 20^* \, L_{n(x,y,z)=const.}$$

is valid, whereby $L_{n(x,y,Z)=const.}$ is the length of the boundary line in a lens section between the zone having a constant, i.e. for practical purposes a no longer changing refractive index, and the zone having a changing refractive index.

By analytical extension is meant an "extension" of the surfaces at given levels based on the same principle of formation that describes the surfaces at given levels in the ophthalmic lens.

Adhering to this condition ensures that the system of surfaces at given levels has a position relative to the boundary surfaces taking their depth of penetration into account so that the change in refractive index has sufficient "optical power".

The following different cases are the result:

1. The reduction of the critical thickness, respectively of the depth of the apex results from the two surfaces, particularly the more curved surface, being deflected in a manner distinctly deviating from Tscherning's principle and/or designed as a rotationally symmetrical aspherical surface having a "curvature decreasing" toward the edge. For the negative refracting zone, the aspherical surface is the rear surface (the surface facing eye), for the positive refracting zone, on the other hand, the front surface.

The correction of the aberrations subsequently occurs that the surfaces at given levels having a constant refractive index intersect the connecting axis beyond the two apexes of the ophthalmic lens, i.e. that the material about and along the optical axis has a constant refractive index (also referred to as uniform hereinafter).

2. The reduction of the critical thickness, respectively of the apex depth, results from a index gradient "between the apexes of the lens". What is meant is that the surfaces at given levels having a constant refractive index intersect the connecting axis "between the apexes of the lens". The gradient is oriented in such a manner that the refractive index reaches its highest value on the side of the ophthalmic lens with the more curved surface.

3. Of course, both the index variation and the design of the more curved surface and, in particular, its aspherical design contribute to the reduction of the critical thickness and/or to the correction of peripheral aberations.

This possible solution with a rear surface designed as an aspherical surface yields negative lenses with substantially less peripherial thickness and much better correction than is the case with conventional negative lenses.

Surfaces at given levels of this type having a constant refractive index can be produced, by way of illustration, in that a blank is made, the one surface or both surfaces of which are surfaces parallel to the surface system, respectively surface systems, having a constant refractive index. Then the variation of the refractive index is produced perpendicular to this surface, respectively to both these surfaces, by means of a state of the art process, by way of illustration by means of ion exchange. For this reason, the surface of the blank, respectively both surfaces of the blank, undergoing an ion exchange, is also referred to as the gradient-generating surface.

After the refractive index variation has been generated, the actual boundary surfaces of the ophthalmic lens are produced.

Thus, however, two or more different systems of surfaces at given levels may be employed, of which, by way of illustration, one system intersects the connecting axis (essentially) between the apexes of the surfaces and the other system intersects the connecting axis on the side facing the eye before the apex of the rear surface. One system is then selected in such a manner that the apex depth, respectively the critical thickness, is reduced the desired amount, whereas the other system of surfaces at given levels is selected according to the required correction of aberrations. An overlapping of the two systems of surfaces at given levels results in corresponding "mixed sections" in the overlapping zone.

Three or more systems of surfaces at given levels may be employed, which are produced, by way of illustration, by means of repeated diffusion processes, between which the gradient-generating surface is changed respectively. Naturally, the gradient-generating surface may also be processed between the individual production steps in such a way that gradient-generating surfaces of varying surface design may be used for different production steps acting on the same side of the lens. It is, however, preferable if—insofar as processing of the gradient-generating surfaces takes place between the individual production steps—these surfaces are processed in such a manner that the gradient-generating surfaces employed respectively on one side of the lens are also surfaces parallel to one another.

Of course, simply different processes, by way of illustration, consecutive varying ion exchange baths may be employed to produce the gradient and the gradient-generating surface may always remain the same.

It is expressly pointed out that, in general, the design of the surfaces at given levels may be any desired one as the decisive factor is the design of the gradient-generating surface(s). In particular, the design of the gradient-generating surface may have a non-monotonic course of curvature, like, by way of illustration, realized in ophthalmic lenses with a bearing edge or a course similar to a progressive surface, etc. gradient is ensured as the form of the surfaces at given levels is a "direct image" of the gradient-generating surface(s): by way of illustration, surfaces at given levels may be produced in the form of cylinder surfaces, saddle-surfaces and/or generally atoroid surfaces by means of appropriately designed gradient-generating surfaces. In this way, ophthalmic lenses with astigmatic power can be made, the front surfaces of which and the surface facing the eye of which have a rotationally symmetrical form so that (by way of illustration) no variation of peripheral thickness occurs in spite of the astigmatic power.

As the form, i.e. the design of the parallel surfaces, on which the refractive index is respectively constant, is no longer restricted by the selected process of production for the index gradient, aberrations may, by way of illustration by optimally corrected in accordance to the respective intention in uniform strength as well as varifocal lenses, i.e. bifocal or trifocal lenses, astigamtic lenses or progressive lenses.

However, it is especially advantageous if, with regard to the production of the gradient-generating surfaces, rotationally symmetrical surfaces are employed, which have in the meridian section a common evolute, the axial starting point of which preferably lies in the object space, respectively a common symmetrical center.

The rotationally symmetrical gradient-generating surfaces may not only be aspherical surfaces, but also, in particular, spherical surfaces or even planes. The use of plane surfaces as gradient-generating surfaces has the advantage that no additional processing steps are required for fabricating an invented ophthalmic lens compared to fabricating conventional ones.

The invented refractive index gradient, which is formed by at least one system of surfaces at given levels having a constant refractive index, has other very advantageous properties in addition to the afore-mentioned ones:

If both surfaces of a conventional ophthalmic lens are selected in such a manner that minor critical thickness is yielded, i.e. the ophthalmic lens is attractive from a cosmetic point of view, the imaging properties of the ophthalmic lens are usually not acceptable. Thus, even if the ophthalmic lens has little dioptric power (corrective value), the refraction error and the astigmatic error override even at a relatively small angle of vision of approximately 25° values of 1 dpt.

The correction of aberrations (refraction errors and astigmatism) of typically up to several diopters resulting in ophthalmic lenses of this type only requires refractive index variations, in which the refractive index varies typically 0.1 to 0.3 units over a zone of a few mm, thus, by way of illustration, increases from 1.5 to 1.7 in a negative lens. Naturally, the intersecting zone of the surface at a given level may also be less than the apex depth so that the "corrective effect" does not "occur" or "stop" until at a specific distance from the optical axis so that the refractive index is constant from this distance on and the peripheral zone of the lens is designed as an "optically not corrected bearing rim", i.e., by way of illustration, it may have a curvature reversal. Furthermore, it is especially advantageous if the width of the variation, the size of a few mm, is exactly the penetration depth usually yielded by ion exchange processes.

In accordance with a feature of the present invention, the refractive index has to increase on the image side (toward the eye) in order to correct a positive astigmatism value (meridional refractive value—sagittal refractive value) and/or a positive refraction error, respectively decrease in order to correct a negative astigmatism value, respectively a refraction error.

By employing a system of surfaces at given levels, which intersect the connecting axis "behind the surface apex facing the eye", practically any correction conditions can be met. By way of illustration, astigmatism can be kept at practically zero over a large angle of vision zone. Furthermore, an optimum ration, from a physiological-optical point of view, between the magnitude of the astigmatism and the refraction error can be maintained. By way of illustration, a higher visus is yielded if the ratio of the absolute values of these two magnitudes is 1:2.

As an expert in the field should easily be able to calculate the variation of the refractive index if the course of the surface is given, respectively the selection of a surface facing the eye if the course of the index change is prescribed by the production process and the selected "gradient-producing surface", from the aforegoing teaching, it is not necessary to give an exact description thereof.

In any event, it is particularly advantageous that with the usually employed "concave" surfaces facing the eye and with the design of the individual surfaces at given levels, the thickness of the layer, in which the refractive index changes, increases in the direction of the edge; this means that the effects achieved by means of the variation of the refractive index increase in the direction of the edge, on the other hand the aberrations, which are to be corrected by the refractive index gradient, also become greater in the direction of the edge so that a synergetic effect of the power of the refractive index gradient and the magnitudes to be corrected is yielded!.

Moreover, the following property of the gradient designed according to the present invention is striking:

Economically, it is unacceptable to have to produce a separate lens, in which the refractive index varies with a special "profile custom-tailored" for the respective correction values, for each special effect.

But rather for efficient production, it is necessary to cover a specific power range with so-called base curves. This means that first half-finished ophthalmic lenses (blanks) ar fabricated, of which only one surface, usually the one more complicated to produce, thus, by way of illustration an aspherical surface, is completely processed. In order to cover a specific power range of typically a few diopters, the second surface is then finished according to the prescribed power. For spherical surfaces usually 6 to 8 base curves are needed to cover a power range of +8 dpt to −10 dpt.

With in such a system of base curves, the proposed invented variation of the refractive index has a number of unanticipated advantages:

Due to the varying refractive index for correcting aberrations, in accordance with the present invention, in the section of the glass material "behind" the apex of the surface facing the eye, the correction of the ophthalmic lens practically does not depend on attaining a specific prescription value in the front surface. This means that with a variation of the front surface, as is usually required in order to be able to fabricate the different prescription values in the desired graduation, the aberrations of the ophthalmic lens, the surface of the eye being given and the profile of the index fixed, can in any event be kept under a certain limit.

Even more unexpected is, however, the fact that a number of surfaces and, in particular, aspherical surfaces can be found for a system of base curves for a given course of the gradient determined by the gradient-generating surface(s), whereby both the requirement of a minor critical thickness and of good aberration correction can be met.

Consequently, the same "base elements", i.e. glass or plastic body blanks having one or two gradient-generating surfaces produced under the same conditions in one and the same ion exchange bath, may be employed for producing adjacent base curves.

In this manner the course of the refractive index selected in accordance with the present invention permits efficient fabrication of ophthalmic lenses over a great range of power.

BRIEF DESCRIPTION OF THE DRAWING

The present invention is made more apparent in the following section using preferred embodiments with reference to the accompanying drawing, depicting.

DESCRIPTION OF PREFERRED EMBODIMENTS

Figure 1:
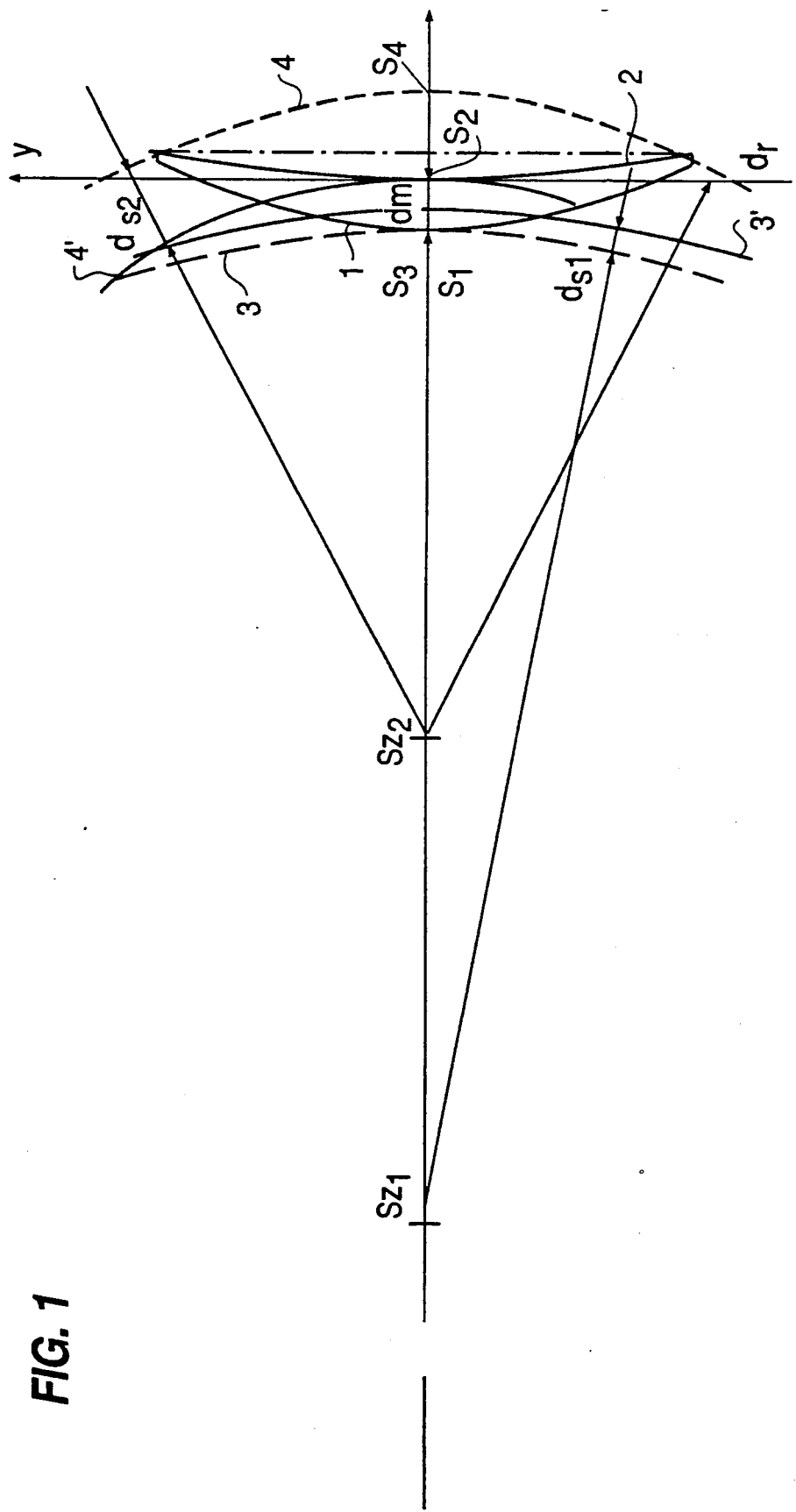
FIG. 1 a lens section of an invented ophthalmic lens in order to explain the terms used herein.

FIG. 1 shows a lens section of an invented ophthalmic lens and the coordinates x,y,z employed in the following in order to explain the terms used in the following section:

The ophthalmic lens has a front surface 1 with a lens apex $S_1$ and a surface 2 facing the eye with a lens apex $S_2$. The distance of the apex $S_1$ of front surface 1 from apex $S_2$ of the surface facing the eye (rear surface) 2 is the so-called center thickness $d_m$, which is the critical thickness in lenses having positive refracting power, i.e. the "greatest thickness". Furthermore, the peripheral thickness $d_r$, which is the critical thickness in lenses having negative refracting power, and the so-called penetration depth $d_{s1}$ and $d_{s2}$ of both systems of surfaces with a constant refractive index, which are made more apparent below, are marked in FIG. 1. By penetration depth $d_s$ is meant that zone over which the refractive index $n(x,y,z)$ changes "optically relevantly" in a vertical direction to the surface of the gradient-generating surface 3, respectively 4. Within the zone bordered by lines 3' and 4', which indicate the depth of penetration, the refractive index is therefore constant.

The so-called apex depth, i.e. the elevation of the apex $S_1$ above the plane through the edge of the lens, which is drawn in FIG. 1 with a dash-dot line, is of significance for the cosmetic impression in the lenses having positive refracting power illustrated in FIG. 1. The greater the elevation, the "more unsightly" the appearance of the spectacles becomes particularly in large, fashionable frames. Consequently, the aim of the selection of so-called flatter base curves, in addition to reducing the center thickness, which is decisive for the weight of the ophthalmic lens, is reducing the apex depth.

The z-axis of the system of coordinates lies in the connecting axis of both apexes $S_1$ and $S_2$ of the ophthalmic lens, the not depicted x-axis is perpendicular to the drawing plane, the y-axis points upward. The zero point 0 of the system of coordinates lies in the apex $S_2$ of the surface facing the eye 2.

In the ophthalmic lens shown in FIG. 1, the front surface 1 and the surface facing the eye 2 are, without any intention of limiting the overall inventive concept, rotationally symmetrical surfaces so that the z-axis is also the optical axis. Naturally, surfaces may be used for one or both of the surfaces, whose surface course is the same as that of ophthalmic lenses having astigmatic and/or progressive refracting power and a uniform refractive index.

Furthermore, the so-called gradient-generating surfaces 3 and 4 are drawn with a dashed line, to which systems of surfaces $n_1(x,y,z)$=const. and $n_2(x,y,z)$=const. with a constant refractive index, by way of illustration 3' and 4', are parallel surfaces: the gradient-generating surface 3 being on the front surface 1 and the gradient-generating surface 4 on the side facing the eye. The term gradient-generating surface is derived from a preferred process for fabricating the invented ophthalmic lenses:

In this process, a blank is first fabricated with one or two gradient-generating surfaces. In a vertical direction to these surfaces, thus by way of illustration to surface 3, a variation of the refractive index is generated in such a manner that surfaces with the constant refractive index $n_1(x,y,z)$=const. are yielded, which are "surfaces parallel" to the gradient-generating surface 3. Parallel surfaces are understood to be a system of surfaces at a given level with a constant refractive index, respectively which are spaced at the same distance at all points in the direction of their surface normals.

In the following section examples, are described, in which the gradient-generating surfaces are
planes: FIGS. 2 to FIG. 8
spherical surfaces: FIGS. 9 to FIG. 12
(a) toric surfaces: FIGS. 13ff.

Insofar as the penetration depth of both surface systems each with a constant refractive index formed by the two gradient-generating surfaces is minor, the ophthalmic lens has two systems of parallel surfaces, which are largely uninfluenced by each other:

In accordance with the present invention, it was discovered that essentially a reduction of the center thickness of the ophthalmic lens can be attained by means of the parallel surfaces $n_1(x,y,z)$=const. with a constant refractive index, which intersect the axis z connecting lens apexes $S_1$ and $S_2$ between the apexes, whereas essentially a correction of the aberrations can be attained by means of parallel surfaces $n_2(x,y,z)$=const. with a constant refractive index, which, more precisely their "analytical" extension beyond the surface facing the eye 2 or the front surface 1 calculated on the basis of the equations defining surfaces $n(x,y,z)$=const., intersect the axis z "behind", i.e. in FIG. 1 to the right of the lens apex facing the eye $S_2$, or "before" the object-side lens apex $S_1$.

The aforegoing is an especially significant result of the present invention, as it permits largely disassociating the center thickness from the correction of aberrations, whereby a specific design of the parallel surfaces $n(x,y,z)=$const. can be attained independently of specific fabricating processes producing the index gradient.

Of course, the gradient-generating surfaces 3, respectively 4, may also be arranged in such a manner that their center points do not lie on the axis z connecting the two lens apexes $S_1$ and $S_2$ and/or that the surfaces 3 and 4 are other surfaces than the ones described in the following preferred embodiments:

By way of illustration, in the case of conventional, rotationally symmetrical gradient-generating surfaces, the individual parallel surfaces with a constant refractive index respectively in the meridian section, i.e. in the section depicted in FIG. 1, a common evolute.

Moreover, in accordance with the present invention it was discovered that for distance A of apex $S_3$, respectively $S_4$ of the gradient generating surfaces 3, respectively 4, from the apex of the next boundary surfaces (1 or 2) the following condition has to be fulfilled:

$$A \leq 20 \cdot L_{n(x,y,z)=cons.}$$

whereby $L_{n(x,y,z)=const.}$ is the length of the border line 3', respectively 4', between the zone with a constant, i.e. for practical purposes the non-varying refractive index and the zone with the varying refractive index in the lens section depicted in FIG. 1.

Meeting the aforegoing condition ensures that the systems of surfaces at a given level have a position relative to the boundary surfaces while taking their penetration depth into account and that the variation of the refractive index has an adequate "optical effect."

The gradient-generating surfaces 3, respectively 4, may, however, also have a surface design similar to progressive surfaces as are being at this time employed in ophthalmic lenses with a constant refractive index for producing an increase in refracting power. If such "progressive" surfaces are used as a gradient-generating surface, a progressive increase in refracting power is attained even if the boundary surfaces 1 and 2 subsequently processed from the blank are rotationally symmetrical surfaces.

In the following section, numerical preferred embodiments are presented for the general embodiment illustrated in FIG. 1.

In the partial FIGS. a and c of FIGS. 4 to 12, the astigmatism S is drawn with solid lines and the so-called refraction error R, i.e. the deviation from the mean dioptric power at a point of the so-called prescription power, with dashed lines. The astigmatism S and the refraction error R are defined by:

$$S = S'_m - S'_s \quad (1)$$

$$R = (S'_m + S'_s)/2 - S'_o; \quad (2)$$

whereby:

$S'_m$ is the tangential dioptric power
$S'_s$ is the sagittal dioptric power
$S'_o$ is the prescription power In each case the values are indicated in the use position in relation to the main beam if centering according to the required point of eye rotation.

The astigmatism S and the refraction error R for an invented ophthalmic lens, i.e. a lens with a varying refractive index and a "homogeneous" reference lens, i.e. a lens with the same surface design as the invented lens, but a constant, i.e. homogeneous refractive index, are indicated in the partial FIGS. a, respectively c.

In the invented lens the refractive index varies according to the function depicted in the partial FIGS. b. In these partial figures, the refractive index n is drawn as a function of the coordinate z defined in FIGS. 1 to 3. Furthermore, a lens section of the respective ophthalmic lens is partially drawn in the partial FIGS. b.

GRADIENT-GENERATING SURFACES: PLANES

FIGS. 2 and 3 show a similar representation as FIG. 1 if a plane is employed as the gradient-generating surface 4 and in one case as the gradient-generating plane 3, which is perpendicular to the axis connecting the two lens apex-es. For this purpose, the coordinate systems used are shown once more in FIGS. 2 and 3.

Figure 2A:
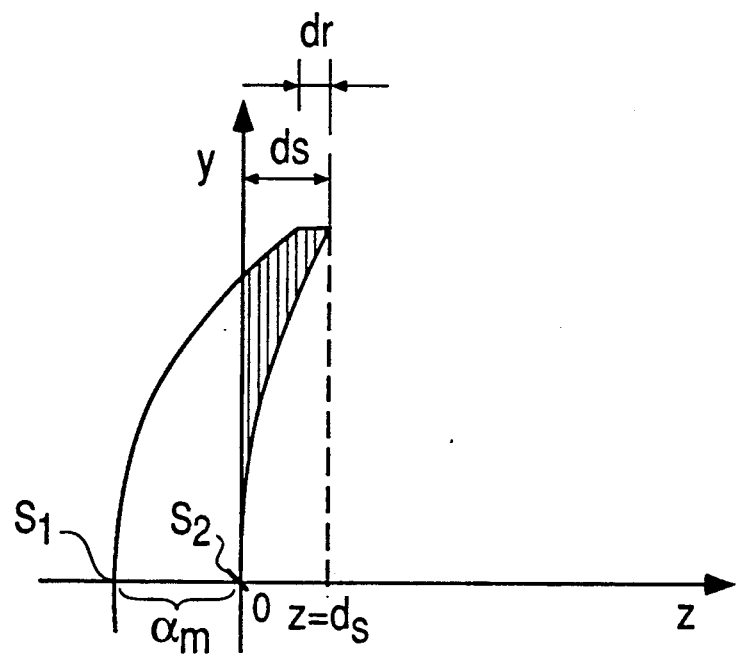
FIG. 2a a cross-section of an ophthalmic lens having positive refracting power, in which the gradient-generating surface is a plane.

FIG. 2a depicts a cross-section of an ophthalmic lens having positive refracting power. As already elucidated, the distance from the apex $S_1$ of the front surface 1 from the apex $S_2$ of the surface facing the eye (rear surface) 2, i.e. the so-called center thickness $d_m$, in lenses having positive refracting power is the critical thickness, which should be as small as possible.

Furthermore, the peripheral thickness $d_r$ and the so-called apex depth $d_s$ are marked in FIG. 2a.

Figure 2B:
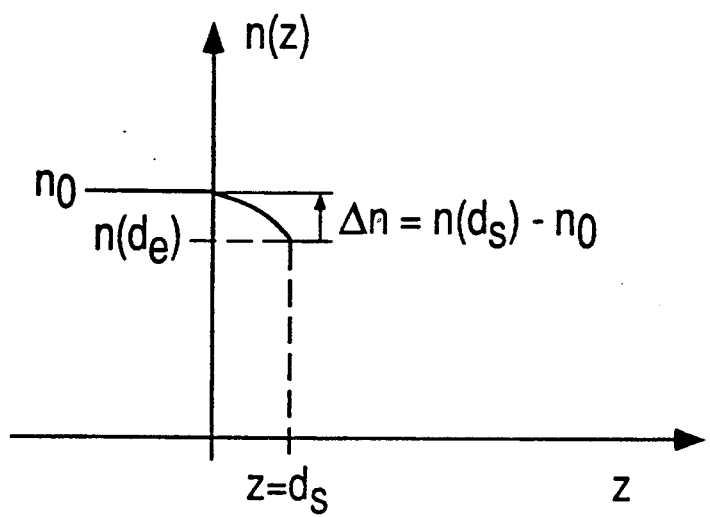
FIG. 2b schematically the respective course of the refractive index.

FIG. 2b depicts schematically the respective invented course of the refractive index n resulting from using a plane as the gradient-generating surface 4. In this case, the refractive index is simply a function of the coordinate z. If the variation of the refractive index is solely intended to produce a correction of peripheral aberrations, the refractive index n is constant between the apexes $S_1$ and $S_2$ of the lens, i.e. for $z<0$, and has a value of $n_o$, i.e. the gradient-generating surface 3 shown in FIG. 1 is not "utilized". In accordance with the present invention, the refractive index only varies in the (in beam direction) material behind the x/y plane passing through the lens apex facing the eye $S_2$; in the schematic example, the refractive index n decreases for values of $z \geq 0$ from the value $n_o$ to the value $n(d_s)$. This is indicated by corresponding hatching.

Figure 3A:
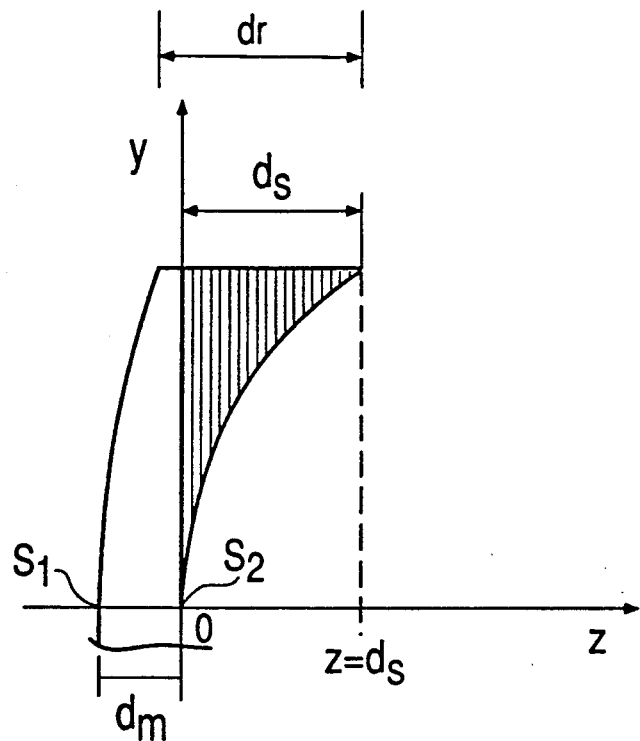
FIG. 3a a cross-section of an ophthalmic lens having negative refracting power, in which the gradient-generating surface is a plane.

FIG. 3a depicts a corresponding cross-section of an ophthalmic lens having negative refractive power, in which the designations stand for the same as in FIGS. 1 and 2 so that a more detailed description is not necessary.

In contrast to lenses having positive refracting power, the critical thickness in lenses having negative refracting power is not the center thickness $d_m$. but the peripheral thickness $d_r$.

Figure 3B:
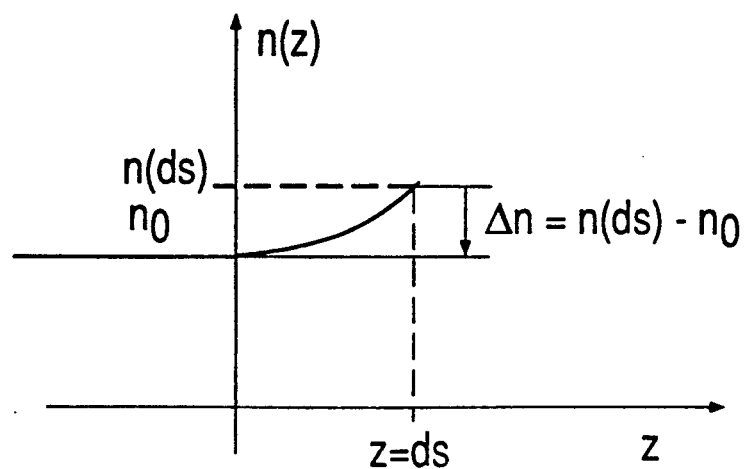
FIG. 3b schematically the respective course of the refractive index.

FIG. 3b depicts schematically the respective invented course of the refractive index n. The refractive index is again only a function of the coordinate z. If the variation of the refractive index is intended to produce the correction of peripheral aberrations, the refractive index n is constant between the apexes $S_1$ and $S_2$ of the lens, i.e. for $z<0$, and has a value of $n_o$. In accordance with the present invention, the refractive index varies solely in the (in the beam direction) material behind the x/y plane passing through the lens apex $S_2$; in FIG. 3b the refractive index n increases for the values of z O from the value $n_o$ to the value $n(d_s)$, which is indicated by corresponding hatching.

In the following section various numerical preferred embodiments of the invented ophthalmic lenses having planes as gradient-generating surfaces 3 and 4 are explicated and compared with ophthalmic lenses having a constant refractive index; FIGS. 4 to 8 illustrating lenses having positive refracting power and FIGS. 9 to 11 lenses having negative refracting power.

All lenses having positive refracting power have the same overall power of $S'=8.00$ dpt, the same curvature of $C_2=1/R_2=5.71$ dpt of the (spherical) surface facing the eye 2 (R: radius of the curvature in the apex of the surface) and the same diameter d of 66 mm. In the embodiments illustrated in FIGS. 4, 5, and 8, the front surface 1 is a spherical surface, in the embodiments illustrated in FIGS. 6 and 7, on the other hand, an aspherical surface. Without any intention of limiting the scope of the overall inventive concept, the aspherical, rotationally symmetrical surface is a conic section surface. Naturally, a more complex aspherical surface may also be employed.

The sagitta z of a point (=distance of this point from the apex of the surface $S_1$ in the direction of the optical axis z) is thus yielded by:

$$z = Cr^2/(1 + (1-(K+1)C^2r^2)^{1/2}) \quad (3)$$

with
r: the distance of the point from the optical axis z
$C=1/R$ with R: the radius of curvature of the surface in the apex $S_1$
K: the conic section coefficient.

In the following Table 1, the individual values of the various embodiments are given numerically:

TABLE 1

| Embodiment FIG. | | 4a | 4c | 5c | 5a | 6 |
|---|---|---|---|---|---|---|
| S' | (dpt) | 8.00 | 8.00 | 8.00 | 8.00 | 8.00 |
| $C_1 = 1/R_1$ | (dpt) | 19.61 | 19.61 | 20.04 | 20.04 | 16.49 |
| $K_1$ | | 0 | 0 | −3.43 | −3.43 | 0 |
| $C_2 = 1/R_2$ | (dpt) | 5.71 | 5.71 | 5.71 | 5.71 | 5.71 |
| $d_m$ | (mm) | 9.48 | 9.48 | 6.32 | 6.32 | 7.12 |
| $d_r$ | (mm) | 0.5 | 0.5 | 0.5 | 0.5 | 0.5 |
| d | (mm) | 66 | 66 | 66 | 66 | 66 |
| n | | | 1.525 | n(z) | 1.525 | n(z) | n(z) |

PREFERRED EMBODIMENT 1

Figure 4A:
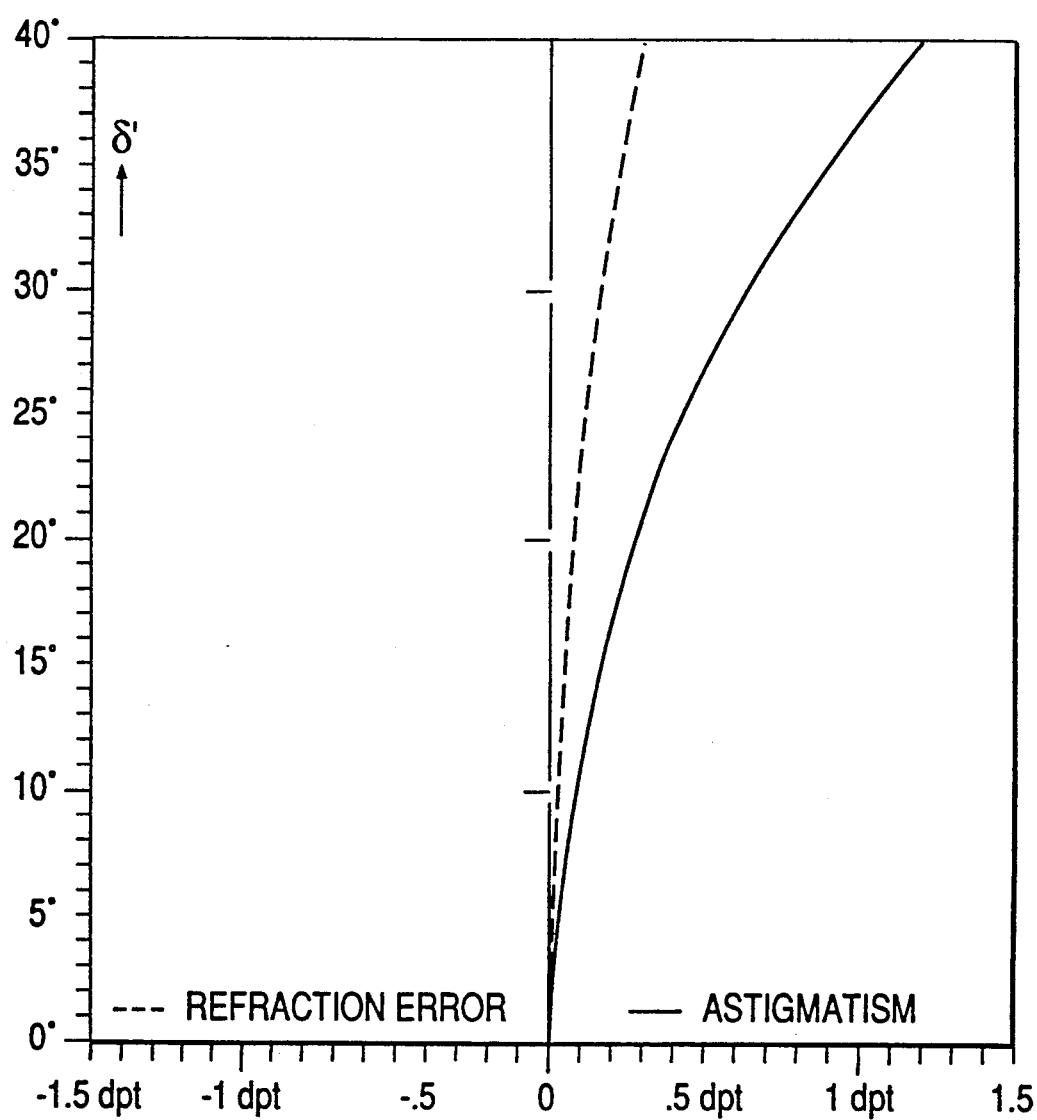
FIG. 4a the aberration of a conventional ophthalmic lens having positive refracting power, in which the refractive index does not vary, FIG. 4b the variation of the refractive index for a first preferred embodiment of the present invention, FIG. 4c the aberration of this preferred embodiment having the refracting power and the same surface design as the lens according to FIG. 4a, however, having a variation of the refractive index according to FIG. 4b, FIGS. 5a to 5c representations analogue to FIGS. 4a–4c of an ophthalmic lens having a front surface selected according to the aspect of minimizing the center thickness, FIG. 6a the aberration of a third preferred embodiment, in which the variation of the refractive index serves to correct the aberration and reduce the critical thickness.

FIG. 4a depicts an aberration, i.e. the astigmatism S and the refraction error R expressed in diopters of a conventional ophthalmic lens having a power S' of 8 dpt. In an ophthalmic lens of this type, the curvature of the front surface 1 and the rear surface 2 is a compromise between the optimum curvature from an image quality aspect and the cosmetically desired "flatter" surface curvature. As can be seen in FIG. 4, both the astigmatism S and the refraction error R are positive. A positive refraction error R is actually undesirable as it cannot be compensated for by accommodation.

Figure 4C:
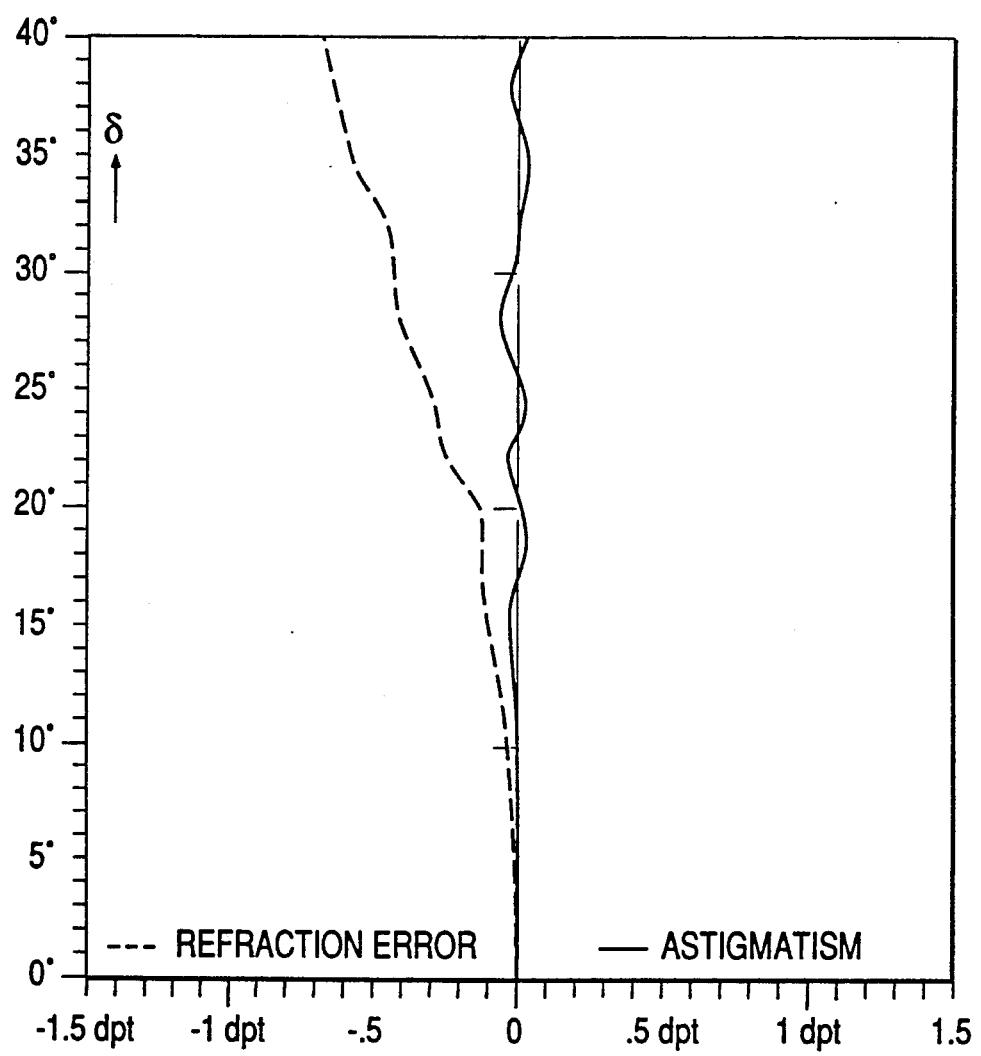
Figure 4B:
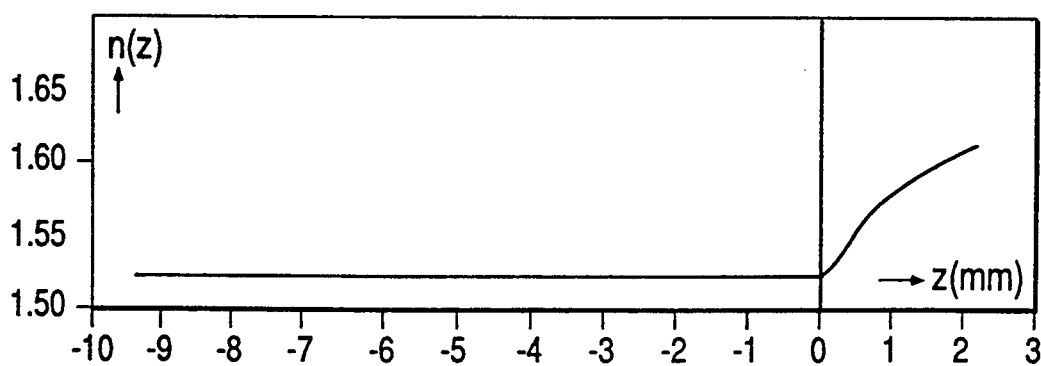

FIG. 4c shows the course of the astigmatism and the refraction error as the function of the angle of vision of a first preferred embodiment of an invented ophthalmic lens having the same surface design as the ophthalmic lens according to FIG. 4a. In the ophthalmic lens illustrated in FIG. 4c, however, the refractive index n varies as a function of z in the manner depicted in FIG. 4b. The refractive index being constant "between" the surface apexes $S_1$ and $S_2$ has the value 1.525 and increases "behind" the x/y plane (cf. FIG. 1, respectively 2a) in the manner to correct aberrations shown in FIG. 4b.

The increase is a result of the fact that the primarily aimed at aberration to be corrected (astigmatism) has too great a positive value over the angle of vision zone.

In the selection of the refractive index variation, a point was made not to stress the reduction of the critical thickness, i.e. the center thickness in positive refracting lenses, but rather to strive at further correction of aberrations. As is evident, the astigmatism can be maintained practically at 0 dpt up to a value of the angle of vision $\sigma$ of 40°. Although the refraction error increases in the direction of greater angles of vision of a comparatively minor value of approximately −0.7 dpt., however, the negative refraction error can be compensated for—at least in cases of not total presbyopia—by accommodation. It is especially advantageous that—despite the fact that only a value for the correction of two aberrations is available —a physiologically more favorable course of the not primarily aimed at corrected aberration (refraction error) is yielded.

PREFERRED EMBODIMENT 2

Figure 5A:
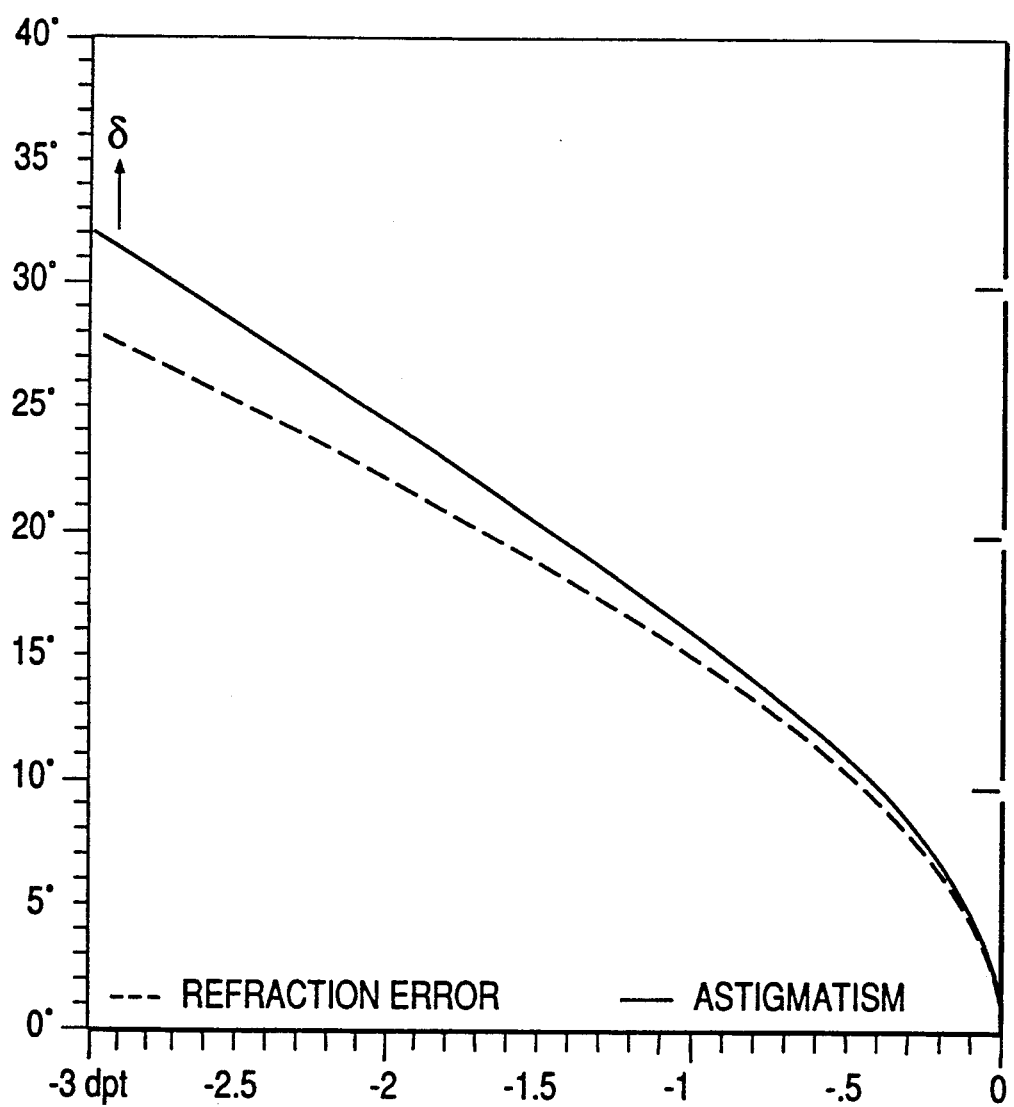

FIG. 5a depicts the course of the aberrations in an ophthalmic lens, in which the front surface is aspherical in design, whereby the front surface is a conic section in accordance with equation (3), whose characteristic values are given in Table 1. The course of the aspherical surface design is solely selected according to the aspect of reducing the center thickness $d_m$, but not according to the aspect of correcting. As is quite evident from FIG. 5a, with a "constant refractive index" non-acceptable aberrations occur even at a comparatively small angle of vision $\sigma$ of 30°: therefore, the refraction error (dashed line) and the astigmatism (solid line) are each greater than approximately −3.0 dpt.

Figure 5C:
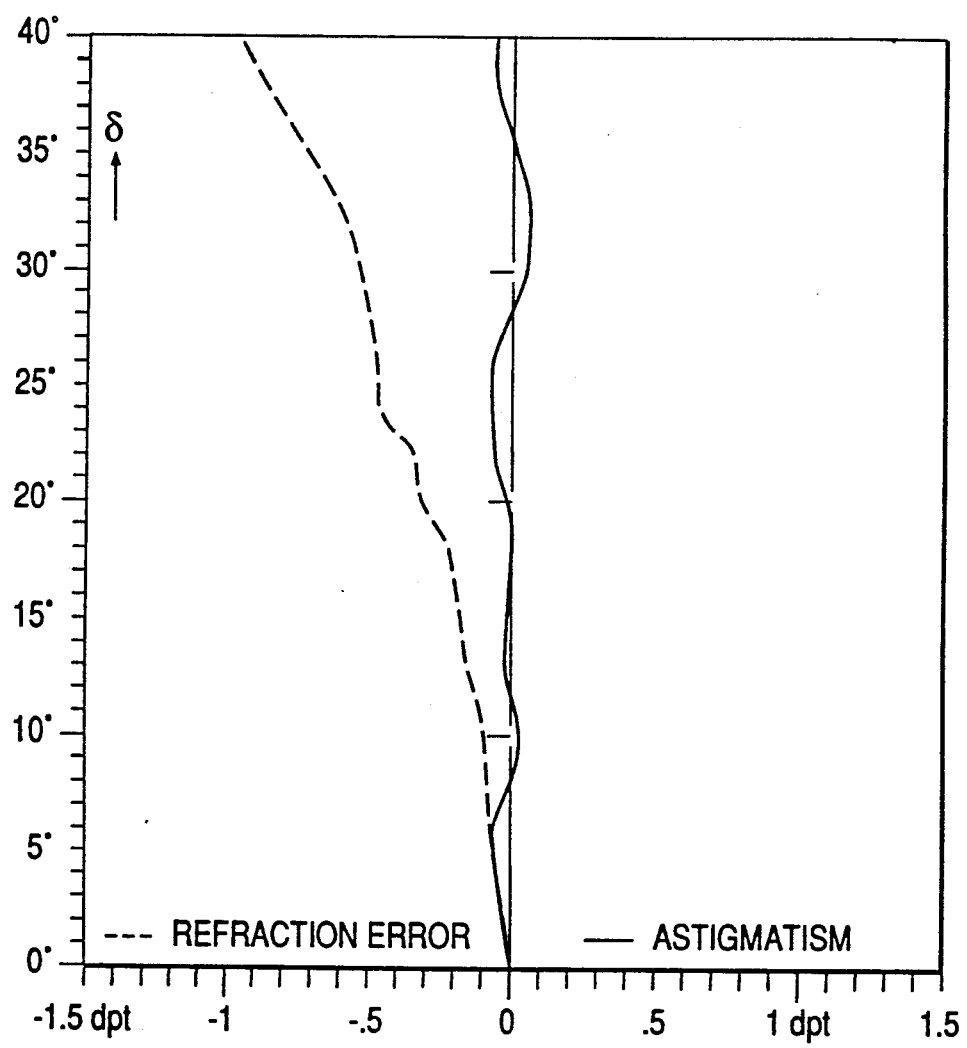
Figure 5B:
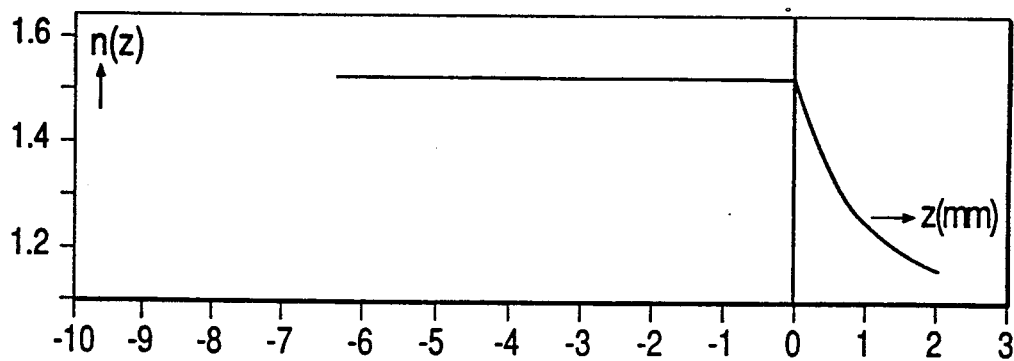

FIG. 5c shows the course of the aberration of an ophthalmic lens having the same surface design as the ophthalmic lens depicted in FIG. 5a, however, with the refractive index varying in the manner illustrated in FIG. 5b. The decrease of the refractive index results from the fact that the aberrations to be corrected (refraction error and astigmatism) have much too large negative values.

As is evident, both aberrations can be corrected by the variation of the refractive index in such a manner that the astigmatism S is practically 0 dpt over the entire angle of vision zone, whereas the refraction error R itself is less than −1,0 dpt at an angle of vision o of 40°. Once more it is to be noted that negative values of the refraction error can be easily compensated by accommodation.

PREFERRED EMBODIMENT 3

Figure 6A:
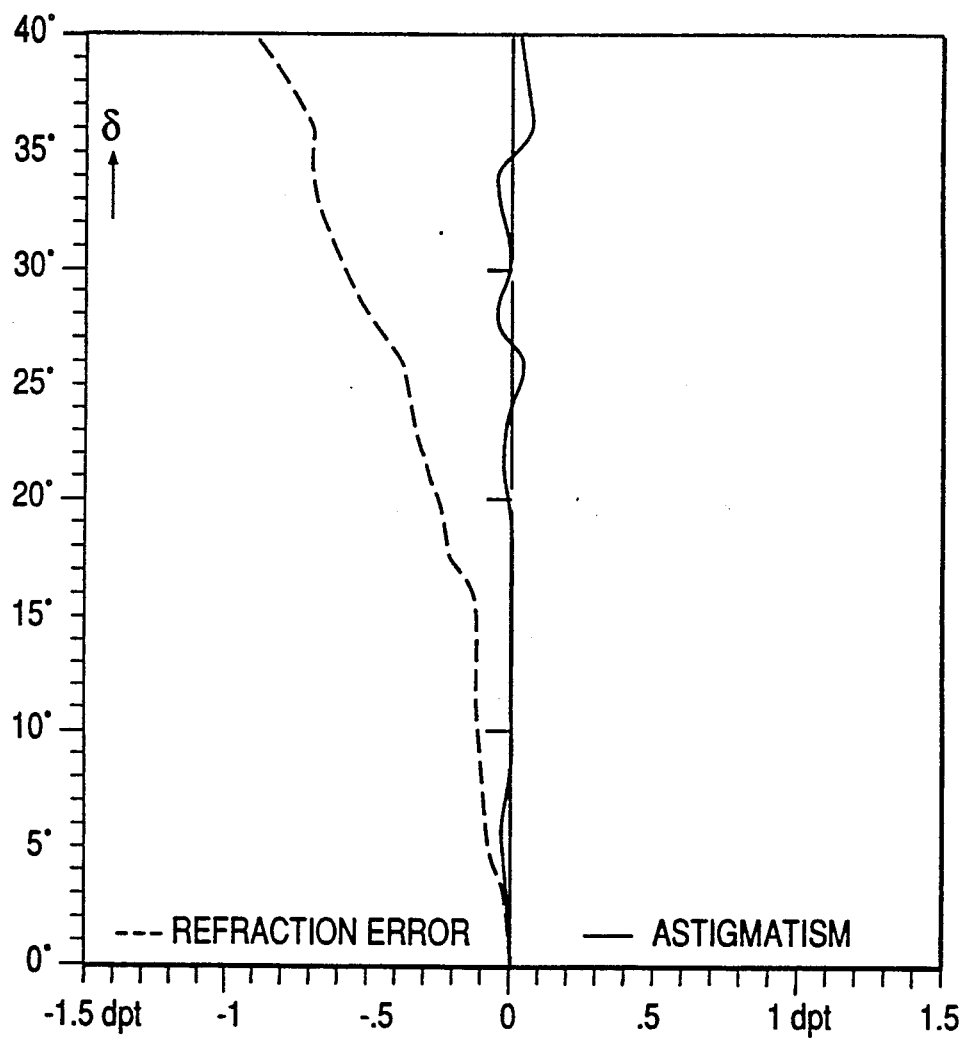
FIG. 6b the respective course of the refractive index.
Figure 6B:
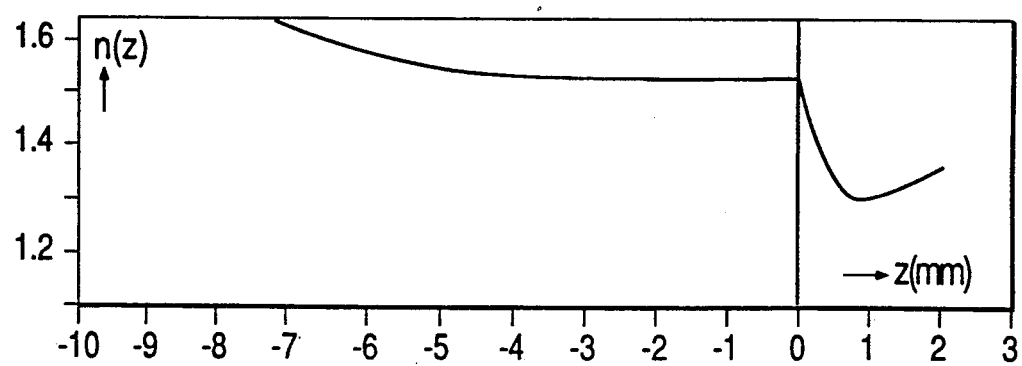

FIG. 6a shows the course of the aberrations of an ophthalmic lens, the boundary surfaces of which are spherical surfaces. In order to reduce the center thickness $d_m$, a curvature of the surfaces is selected that "strongly deviates" from Tscherning's principle than is the case with the ophthalmic lens illustrated in FIG. 4a, respectively 4c, and in addition a variation of the refractive index "between the lens apexes $S_1$ and $S_2$" is introduced. In other words, in this preferred embodiment not only the gradient-generating surface 4, but also the gradient-generating surface 3 is employed to generate a variation of the refractive index. In this preferred embodiment both gradient-generating surfaces are planes. Thus, the refractive index varies—as shown in FIG. 6b—not only "behind the surface facing the eye", but also in such a manner that it has a greater value in the region of the surface contributing more to the refractive index, i.e. the region of the front surface in a lens having positive refracting power, than in the base material. In this case, with an overall power of the ophthalmic lens of 8.0 dpt and an initial refractive index of 1.525, the center thickness can be reduced 25% compared to conventional ophthalmic lenses according to FIG. 4c. Nonetheless, it is still possible to meet specific correction conditions; in the case of the depicted preferred embodiment the correction condition used was that the astigmatism was practically zero over the entire angle of vision zone.

In the following section, lenses having negative refractin power are described as further preferred embodiments.

All lenses having negative refracting power have the same overall power of $S' = -10.00$ dpt, the same curvature of the (spherical) front surface of $C_1 = 1/R_1 = 3.81$ dpt, and the same diameter d of 66 mm. In the embodiment illustrated in FIG. 7, the rear side 1 is a spherical surface, in the embodiments illustrated in FIGS. 8 and 9, on the other hand, it is an aspherical surface. Without any intention of limiting the overall inventive concept, the aspherical, rotationally symmetrical surface is a conic section surface, the sagitta of which z (= the distance of a point from the apex of the surface $S_2$ in the direction of the z axis) is given by the following equation:

$$z = Cr^2/(1 + (1-(K+1)C^2r^2)^{1/2}) \quad (4)$$

with
r the distance of the point from the optical axis z
$C = 1/R_2$ with $R_2$: the radius of curvature of the surface in the apex $S_2$
K: the conic section coefficient.

In the following Table 2 the individual sizes for the different embodiments are given numerically:

TABLE 2

| Embodiment FIG. | | 7 | 8a | 8c |
|---|---|---|---|---|
| S' | (dpt) | −10.00 | −10.00 | −10.00 |
| $C_1$ | (dpt) | 3.81 | 3.81 | 3.81 |
| $C_2 = 1/R_2$ | (dpt) | 22.86 | 22.86 | 22.86 |
| $K_1$ | | 0 | −6.93 | −6.93 |
| $d_m$ | (mm) | 1.0 | 1.0 | 1.0 |
| $d_r$ | (mm) | 13.95 | 6.98 | 6.98 |
| d | (mm) | 66 | 66 | 66 |
| n | | 1.525 | 1.525 | n(z) |

PREFERRED EMBODIMENT 4

Figure 7:
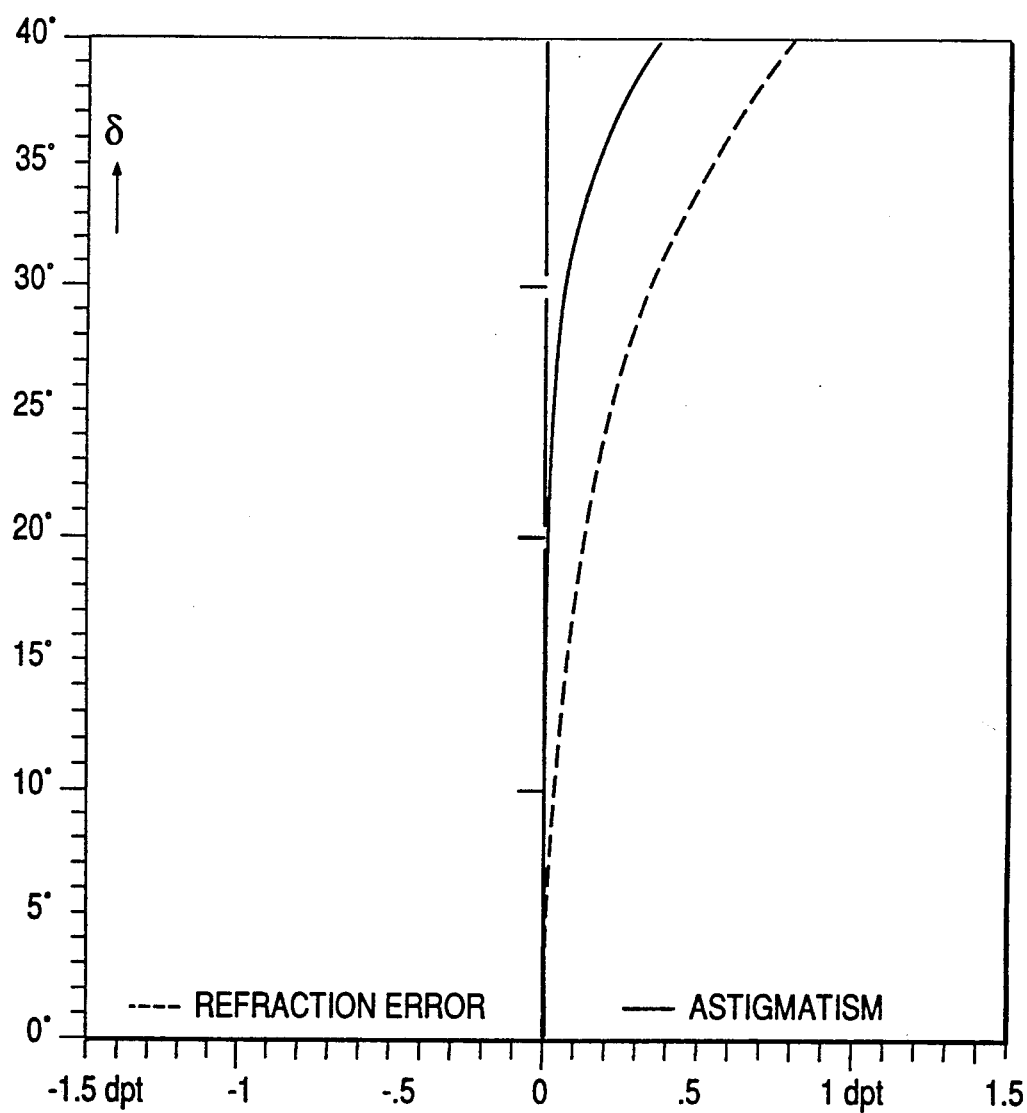
FIG. 7 the aberration of a conventional ophthalmic lens having negative refracting power, in which the refractive index does not vary, FIG. 8a the aberration of an ophthalmic lens having a constant refractive index and having an aspheric surface facing the eye selected according to the aspect of minimizing the peripheral thickness, FIG. 8b the variation of the refractive index for a fourth preferred embodiment of the present invention, FIG. 8c the aberration of this preferred embodiment having the same refracting power and the same surface design as the lens according to FIG. 8a, however, having a variation of the refractive index according to FIG. 8b, FIGS. 9a to 9a representations analogue to FIGS. 4a–4c of a fifth preferred embodiment having a front surface selected according to the aspect of minimizing the center thickness and a gradient-generating surface designed as a spherical surface, FIG. 10a the aberration of an ophthalmic lens having a constant refractive index and having an aspherical surface facing the eye selected according to the aspect of minimizing the peripheral thickness, FIG. 10b the variation of the refractive index for a sixth preferred embodiment of the present invention, FIG. 10c the aberration of this preferred embodiment having the same refracting power and the same surface design as the lens according to FIG. 10a, however, having a variation of the refraction index according to FIG. 10b, FIG. 11a to 11c representations analogue to FIGS. 8a–8c of a seventh preferred embodiment having a front surface with a bearing rim selected according to the aspect of minimizing the center thickness and a gradient-generating surface designed as a spherical surface, FIGS. 12a to 12c representations analogue to FIGS. 4a–4c of an eighth preferred embodiment having a surface facing the eye with a bearing rim selected according to the aspect of minimizing the peripheral thickness and a gradient-generating surface designed as a spehrical surface, FIGS. 13a and 13b the aberrations of a ninth preferred embodiment of an invented ophthalmic lens having astigmatic power, and FIGS. 14a and 14b for comparison, the aberrations of a conventional ophthalmic lens having astigmatic power.

FIG. 7 depicts a conventional ophthalmic lens having a constant refractive index, in which the curvature of the front surface 1 and of the surface facing the eye 2 is selected as a compromise between the optimum curvature from an aberration aspect and the flatter curvature desired for cosmetic reasons. As is evident, the aberrations are comparatively small, however, the peripheral thickness $d_r$ is too large with 13.95 so that the lens can practically not be ground to fit into fashionable spectacle frames and, moreover, it is very heavy.

Figure 8A:
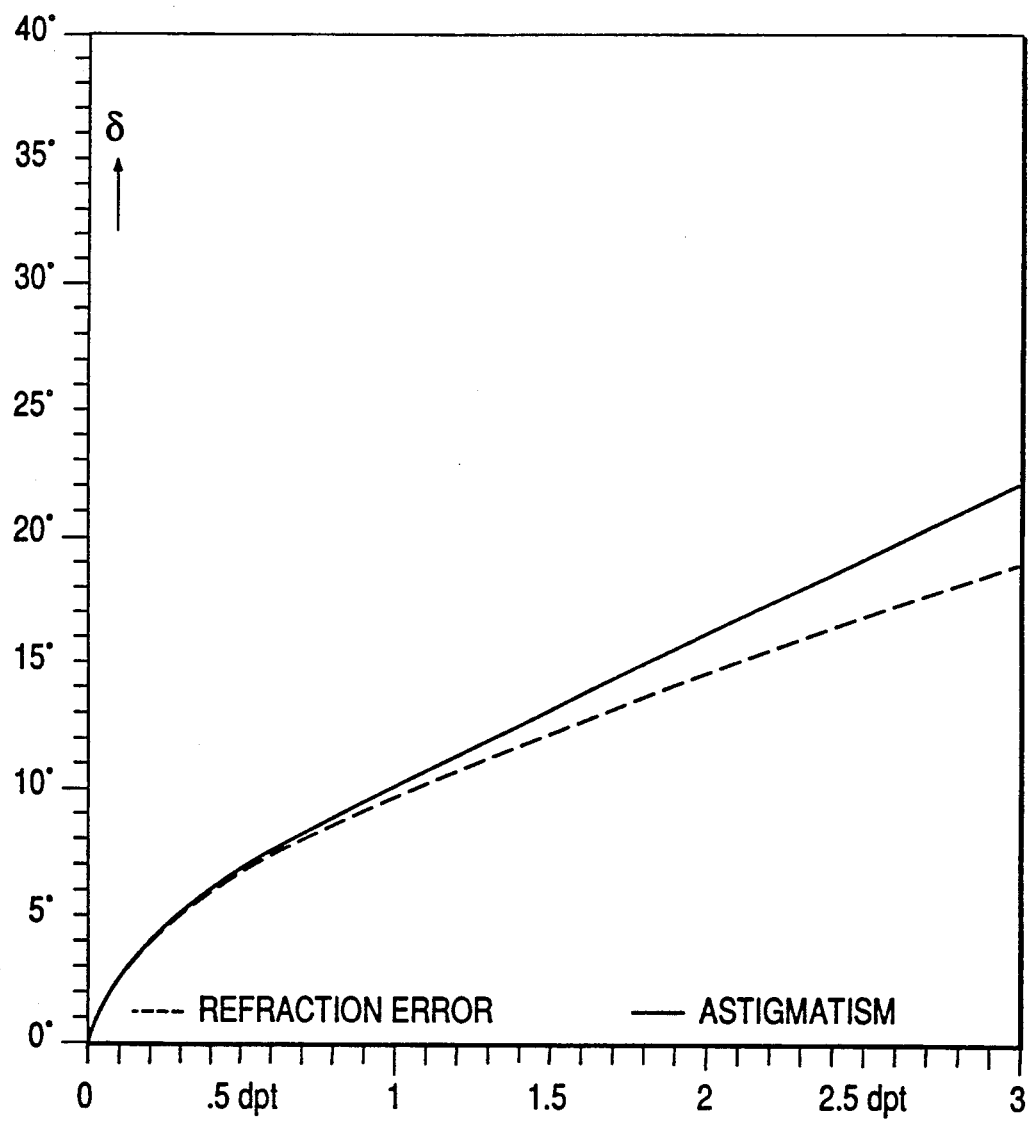

FIG. 8a illustrates an example of a lens having negative refractive power, in which the surface facing the eye 2 is designed as an aspherical surface in order to reduce the peripheral thickeness. Without any intention of limiting the scope of the overall inventive concept, the eye facing surface 2 is a conic section surface in according to equation (4), the characteristic values of which are given in Table 2. By employing this aspherical surface the peripheral thickness $d_r$ can be reduced considerably to 6.98 mm, however, the aberrations, the refraction errors and the astigmatism reach unaccpetable values of 2.5 dpt and more already at angles of vison of less than 20°.

Figure 8C:
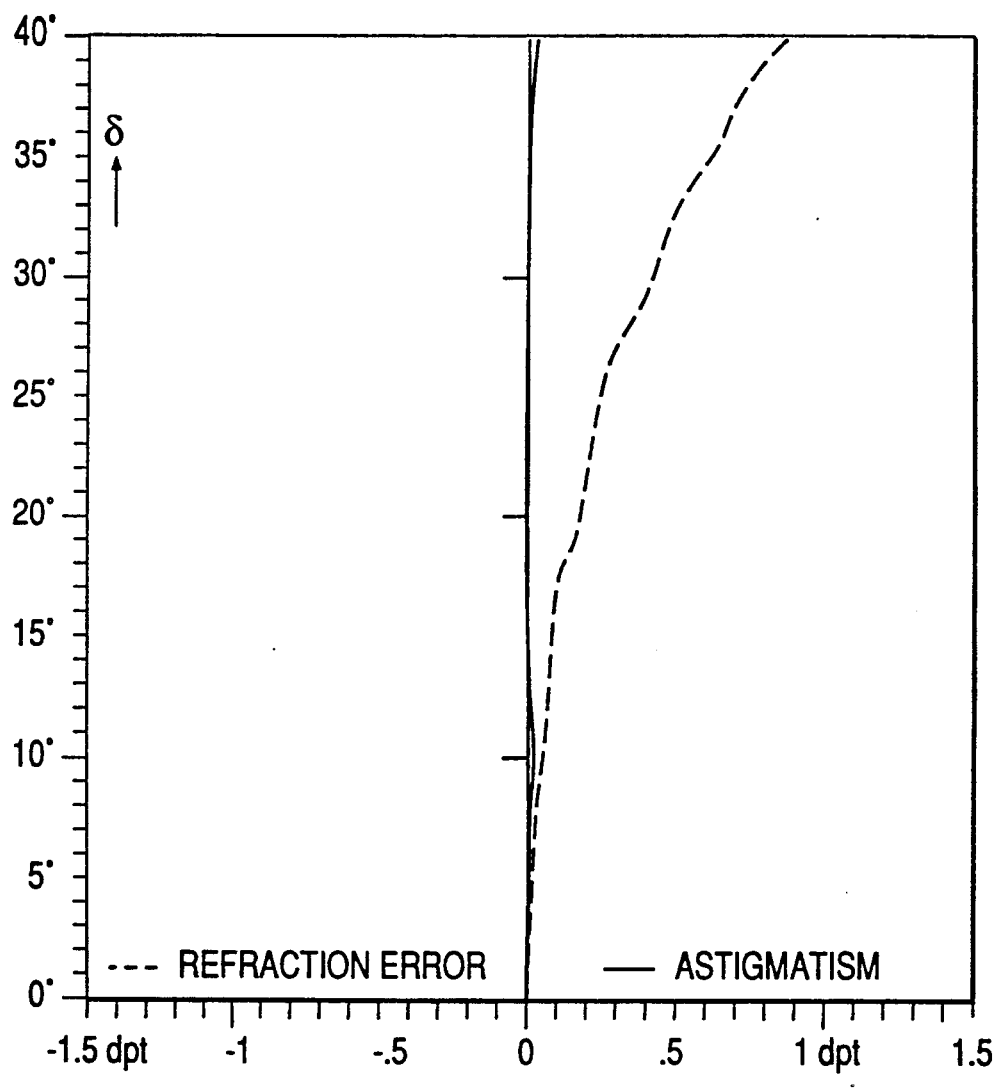

FIG. 8c depicts the effect of a refractive index variation "behind the apex of the surface facing the eye $S_2$" on the aberrations. The surface design of the lens and thus also the center and peripheral thickness correspond to the lens illustrated in FIG. 8a. In particular, the individual values of the conic section surface are to be taken from Table 2.

Figure 8B:
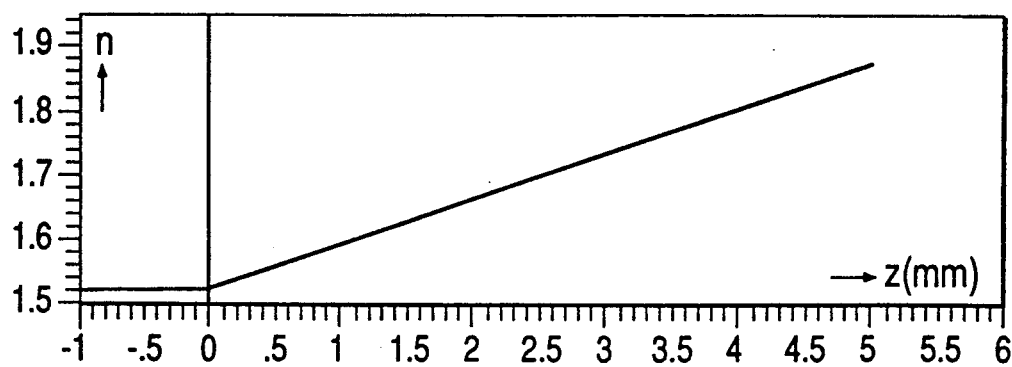

By means of the variation of the refractive index according to FIG. 8b, the aberrations depicted in FIG. 8a produced by the design of the surface can be corrected to very small values. In particular, in the case of the fourth embodiment, the aberration of which is depicted in FIG. 8c, on the other hand, the correction condition "astigmatism over the angle of vision zone practically=0" is fulfilled.

As in the "homogeneous case", both the refraction error and the astigmatism have assumed positive values, a rise in the refractive index behind the apex of the surface facing the eye (z=0)—as shown in FIG. 8b—is necessary.

Gradient-generating Surfaces: Spherical Surfaces

Without any intention of limiting the scope of the overall inventive idea, the gradient-generating surfaces 4 in the embodiments illustrated in FIGS. 9 to 12 are spherical surfaces, the center point of the curvature of which, designated by $SZ_2$, is simultaneously the symmetrical center of the respective parallel surfaces. In the illustrated preferred embodiments, the center point of the spherical surfaces 4 lies on the axis z connecting the lens apexes $S_1$ and $S_2$ In the cases of rotationally symmetrical surfaces 1 and 2, this axis coincides with the optical axis of the ophthalmic lens.

Furthermore, for the purpose of simplification, the following section will only consider the case in which the front surface 1 and the surface facing the eye 2 are rotationally symmetrical surfaces.

Therefore—as already mentioned—the axis z connecting the lens apexes $S_1$ and $S_2$ coincides with the optical axis of the ophthalmic lens.

Furthermore, only a single gradient-generating surface is employed in all the presented preferred embodiments in the following section, namely surface 4, yielding parallel surfaces having a constant refractive index n(x,y,z)=const., which intersect the optical axis on the side facing the eye before the rear lens apex $S_2$. The gradient-generating surface 3 is not used in the described preferred embodiments for generating a variation of the refractive index on the optical axis between the lens apexes so that essentially the variation of the refractive index only contributes to the correction of aberrations, but not to the reduction of the center thickness $d_m$ in ophthalmic lenses having positive refracting power, respectively to the reduction of the peripheral thickness dr in lenses having negative refracting power.

In contrast to present day conventional spherical ophthalmic, respectively in contrast to ophthalmic lenses whose boundary surfaces 1 and 2 may be selected according to the so-called Tscherning principle, a reduction of the center thickness $d_m$ is attained by a special design of the surface instead, which—as will be shown in the following section—would result in unacceptable aberrations without the invented variation of the refractive index and, in particular, with a constant refractive index.

Preferred embodiments 5 and 7 of the preferred embodiments described in the following section are ophthalmic lenses having positive power and an apex power +8 dpt, whereas embodiments 6 and 8 are ophthalmic lenses having negative refractive power and an apex index of −10 dpt.

Embodiments 5 and 7, respectively 6 and 8, differ in that in embodiments 5 and 6 the optical utilizable zone is the same as the overall diameter of the ophthalmic lens, whereas in embodiments 7 and 8 the optical utilizable zone is smaller than the diameter of the ophthalmic lens so that a "bearing rim" joins in the peripheral region, as is presently customary, by way of illustration in so-called star lenses.

PREFERRED EMBODIMENT 5

This preferred embodiment is—as previously mentioned—a lens having positive refractive power, respectively dioptric power, the front surface 1 of which (cf. FIG. 1) is a conicoid surface (conic section surface), the sagitta of which z (=the distance of a point from the apex of the surface $S_1$ in the direction of the optical axis z) is again yielded by the equation (3), wherein the individual values have the following values:

$R_1 = 54.7$ mm
$K = -4.55$

The surface 2 facing the eye is a spherical surface having a radius of $R_2 = 175$ mm.

A diameter of 66 mm and a peripheral thickness $dr = 1.0$ mm results in a center thickness of 5.78 mm. This center thickness is approximately 33% less than the center thickness of presently fabricated spherical lenses having a constant refractive index ($n = 1.6$ and the same surface facing the eye).

Figure 9A:
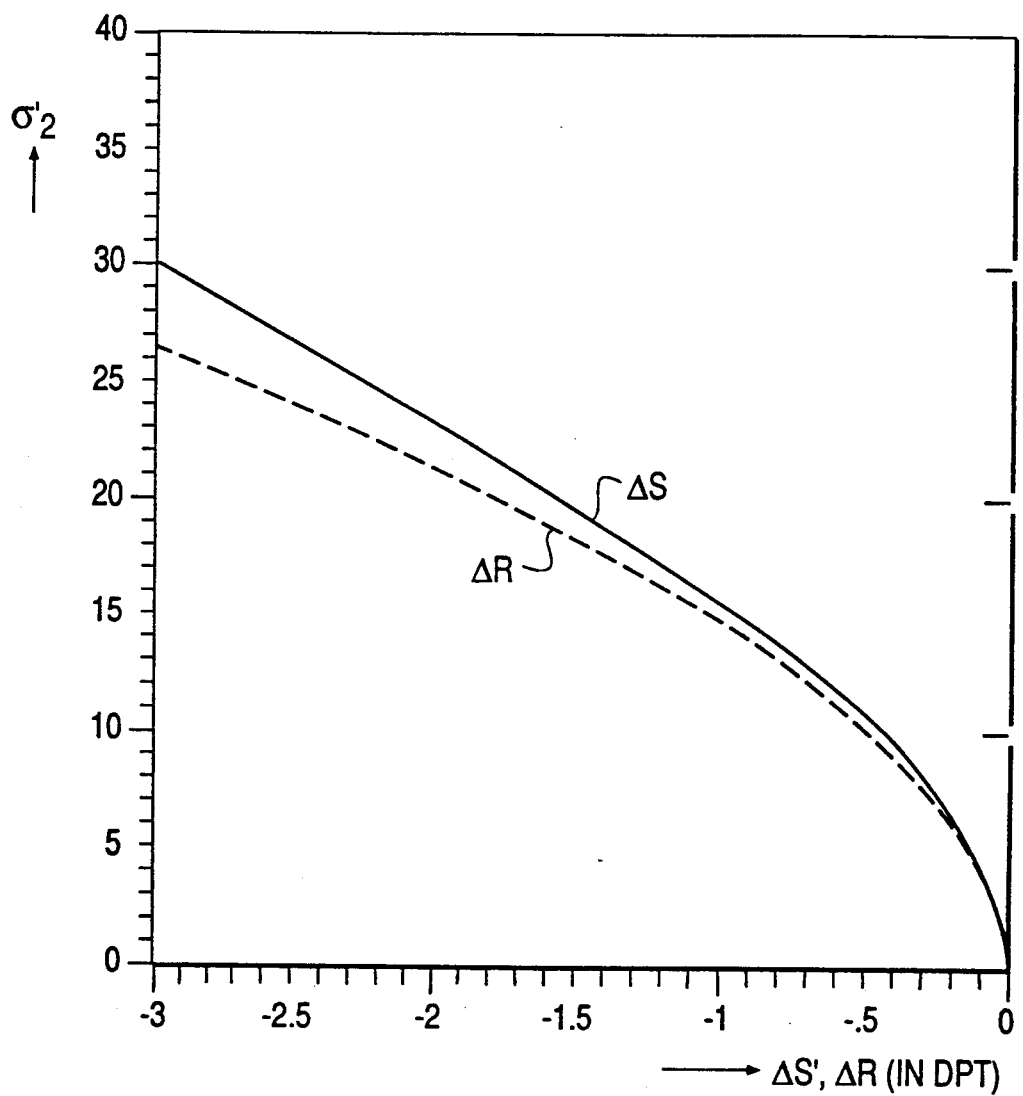

If such a lens had a constant refractive index of $n = 1.60$, it would have a spherical power of +8.0 dpt, but unacceptable imaging properties:

FIG. 9a depicts the course of the refraction error R and of the astigmatism S in diopters for the aforegoing lens having a constant refractive index as the function of the angle of vision $\sigma'$, whereby these errors are again defined by the equation (1), respectively (2).

As FIG. 9 indicates, an angle of vision $\sigma$ of 30° on the side facing the eye would result in aberrations to the magnitude of 3 dpt and more.

Figure 9C:
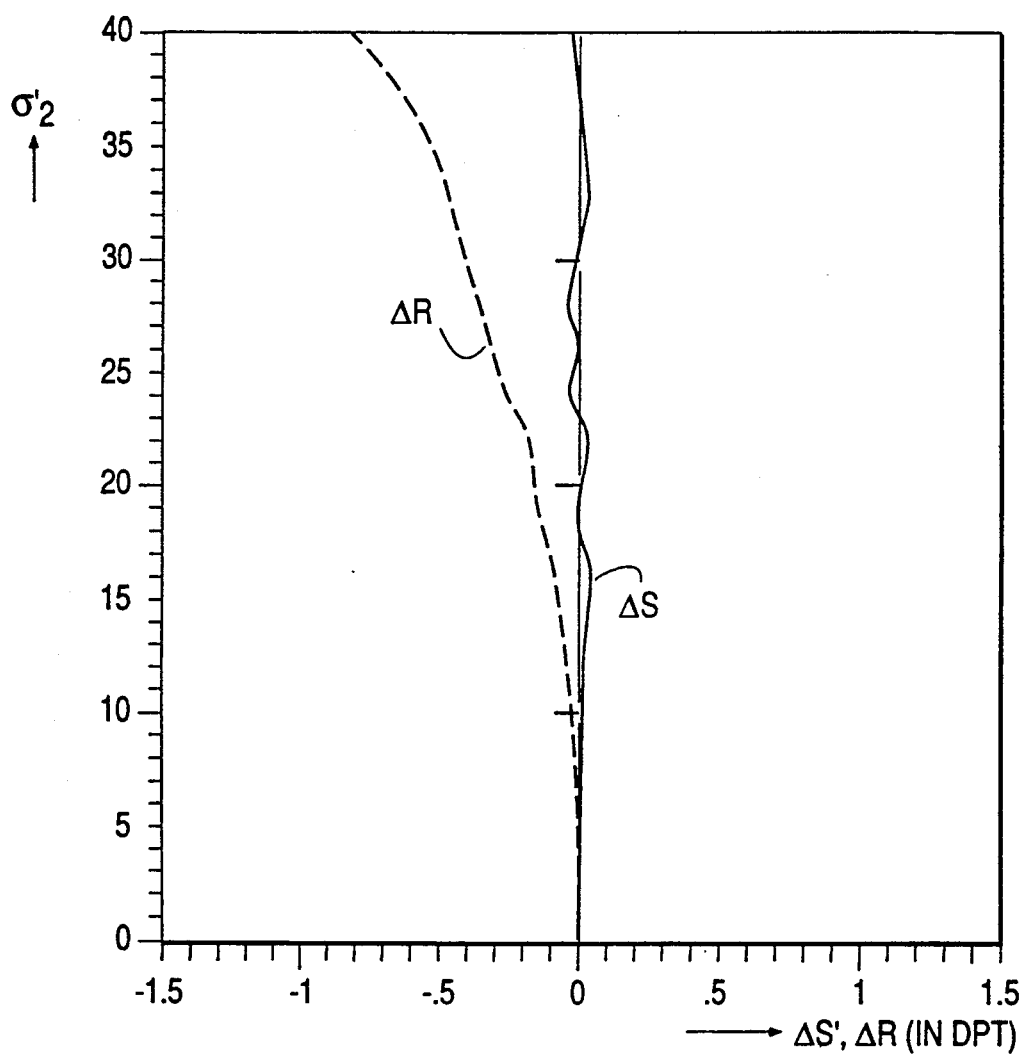
Figure 9B:
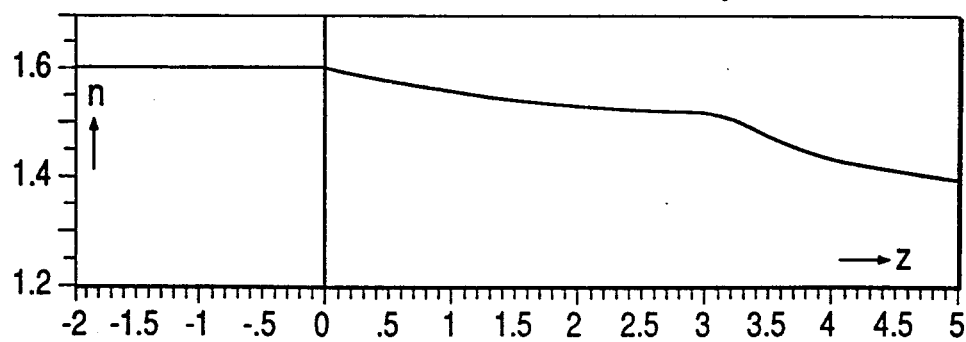

FIG. 9b shows the invented course of the refractive index along the z-axis, which coincides in the illustrated preferred embodiment with the optical axis, with the zero point being in the rear apex of the surface $S_2$. The surfaces having a constant refractive index are spheres, whose center of symmetry SZ lies at $z = 70$ mm. As FIG. 9b indicates, in a region along and about the z-axis, the refractive index only changes in the region behind, i.e. to the right ($z > 0$) of the apex of the lens facing the eye $S_2$ ($z = 0$), i.e. the variation of the refractive index contributes only to the correction of aberrations according to the preceding descriptions. The depth of penetration $d_s$ is 10.2 mm.

The course of the refractive index illustrated in FIG. 9b can, by way of illustration, be produced by exposing a blank provided with a gradient-generating surface 4 to different consecutive ion-exchange baths. If necessary, the gradient-generating surface may also be ground off between the individual ion-exchange baths and replaced by a different gradient-generating surface, preferably by a surface parallel to the first gradient-generating surface.

The invented variation of the refractive index according to FIG. 9b yields the course of the refraction error R and of the astigmatism S shown in FIG. 9c. As FIG. 9c indicates, the astigmatism S is practially zero over the entire angle of vision zonr, whereas the refraction error has a negative value, which does not attain values of −0.5 until an angle of vision of 25°, at which the negative course of the refraction error becomes physiologically favorable.

It is expressly pointed out that, due to the invented design, practically any prescribed course can be maintained for the course of one of the two aberrations. In particular, other conditions can also be met, by way of illustration, a specific ratio between the refraction error, which assumes a negative value, and the astigmatism, which is assumes a positive value.

Furthermore, it is pointed out that the change in the refractive index is comparatively small with approximately 0.2 units so that it can be made with the present state of the art ion-exchange processes.

PREFERRED EMBODIMENT 6

In this preferred embodiment, the surface facing the eye 2 is a conicoid surface (conic section surface), the sagitta of which z (=the distance of a point from the apex of the surface $S_2$ in the direction of the z-axis) is yielded by the equation (4), wherein the individual values have the following values:

$R_2 = 43.75$ mm
$K = -6.92$

The front surface 1 is a spherical surface having a radius of $R_1 = 262.5$ mm.

In contrast to lenses having positive refractive power, in lenses having negative refractive power the center thickness $d_m$ is not the critical thickness, but the peripheral thickness $d_r$.

A diameter of 66 mm and a center thickness of $d_m = 1.0$ mm result in a peripheral thickness of 6.97 mm. This peripheral thickness is approximately 50% smaller than the peripheral thickness of presently fabricated spherical lenses having a constant refractive index of ($n = 1.525$ and the same front surface 1).

If the aforegoing lens had a constant refractive index of n = 1.525, it would have a spherical power of $S'_o = -10.0$ dpt, but unacceptable imaging properties: FIG. 10 a depicts the course of the refraction error R and the astigmatism S in diopters as the function of the angle of vision $\sigma'$ for an ophthalmic lens with the above-described design of the surface and a constant refractive index, these errors again being defined by the equations (1) and (2).

Figure 10A:
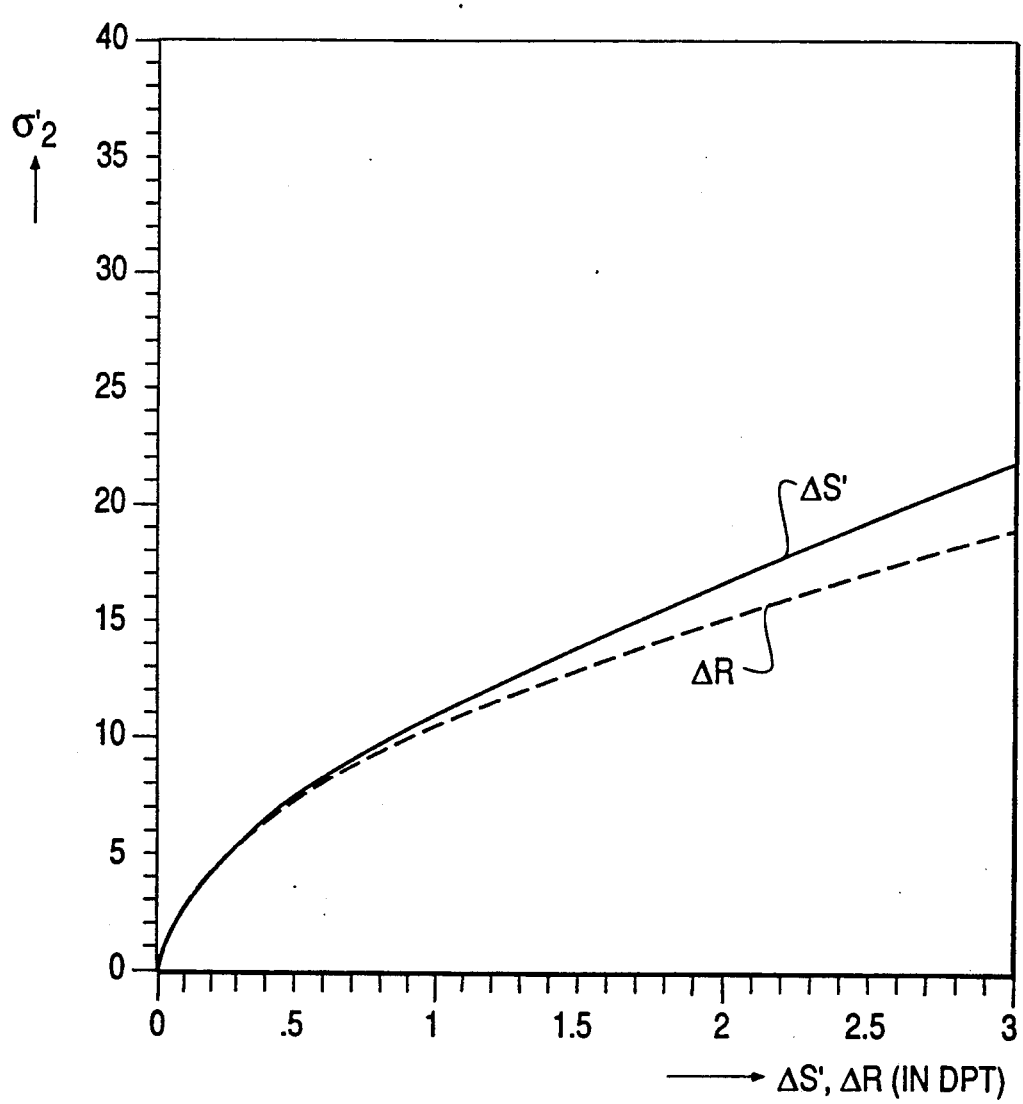

As FIG. 10a indicates, an angle of vision of 30° would result in aberrations to the order of 3 dpt and more.

Figure 10C:
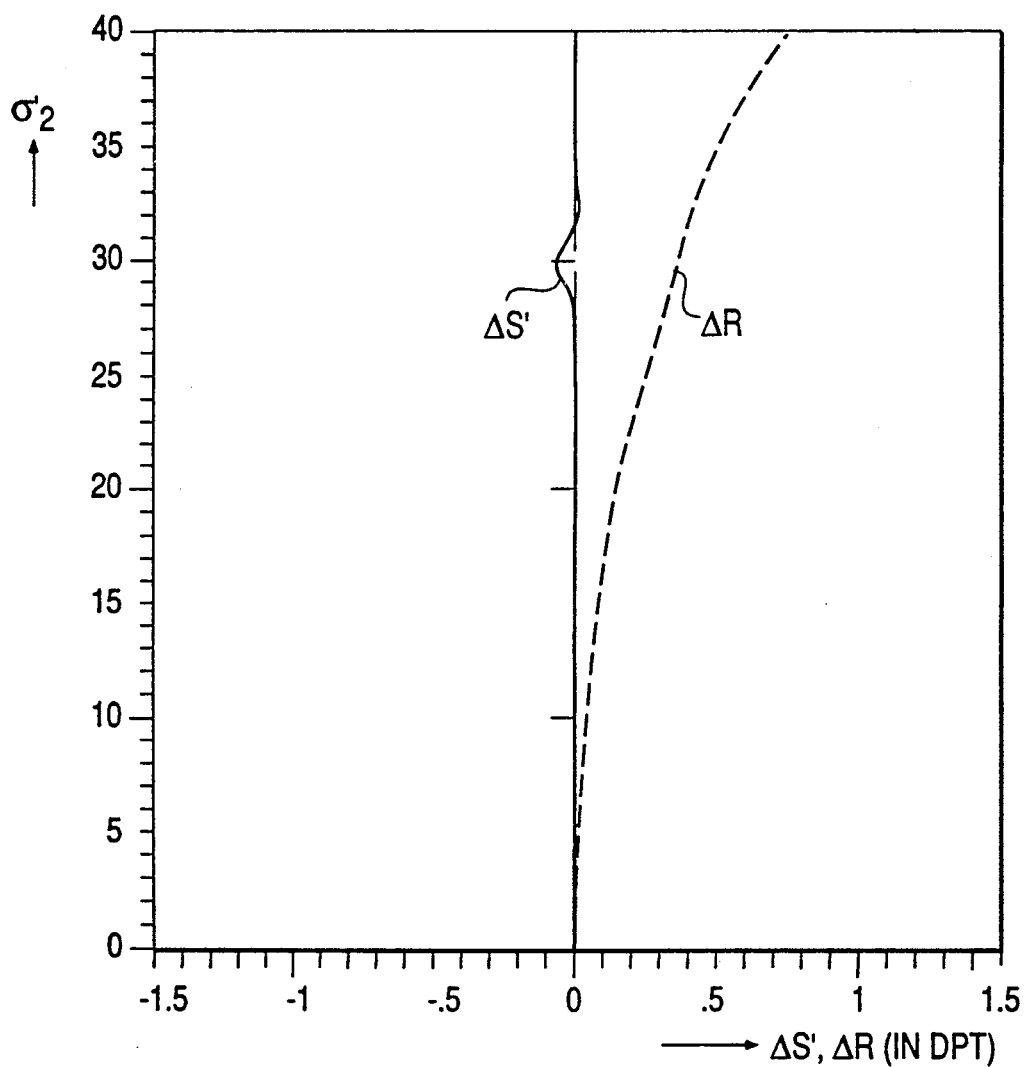
Figure 10B:
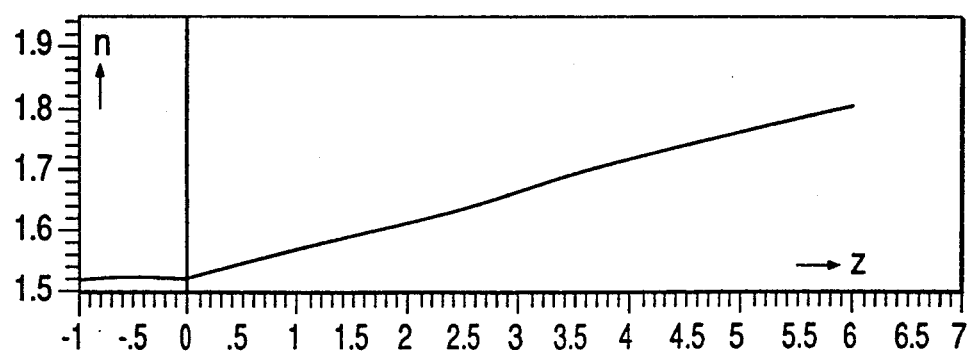

FIG. 10b depicts the course of the refractive index on the optical axis, the zero point being in the rear apex of the surface $S_2$. The surfaces having a constant refractive index are spherical surfaces, whose center of symmetry SZ lies at $z = -200$ mm. Between the lens apexes $S_1$ and $S_2$ ($z < 0$)., the refractive index is once more constant on and about the optical axis. The depth of penetration $d_s$ of the gradient is 10.7 mm.

The course of the refraction error R and of the astigmatism S shown in FIG. 10c is yielded by this means. As FIG. 10c indicates, the astigmatism S is practically zero over the entire angle of vision zone, whereas the refraction error has a minor positive value, which does not attain values of +0.5 dpt up to an angle of vison of 25°.

It is expressly pointed out that, due to the invented design, practically any prescribed course can be maintained for the course of one of the two aberrations. In particular, other conditions can also be met, by way of illustration, a specific relationship between the refraction error and the astigmatism.

PREFERRED EMBODIMENT 7

Figure 11A:
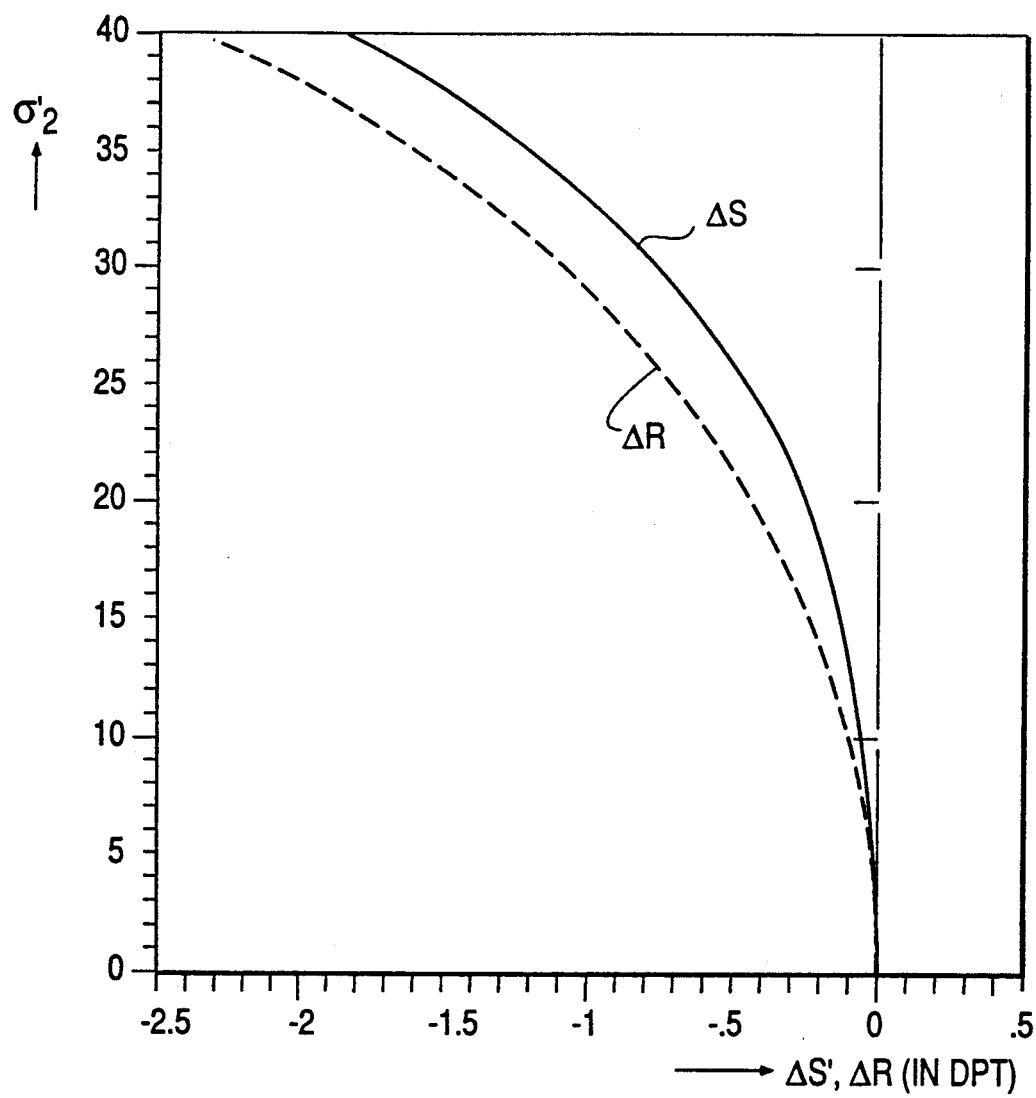
Figure 11B:
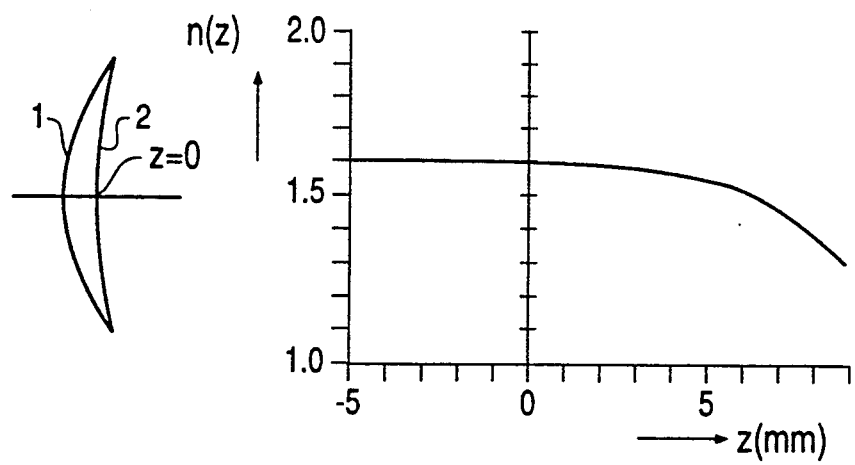

A lens section of a third preferred embodiment of the present invention is depicted in the left half of partial FIG. 11b, in which the designations again stand for the same as in FIG. 1 so that presenting them again is not necessary.

In this preferred embodiment, the front surface 1 is a conicoid surface (conic section surface) modified by additional elements in such a manner that a "bearing rim" is yielded. In the illustrated preferred embodiment, the sagitta z (=the distance of a point from the apex of the surface $S_1$ in the direction of the z-axis) is yielded by:

$$z = Cr^2/(1+(1-(K+1)C^2r^2)^{1/2}) + a_4 * r^4 + a_6 * r^6$$

with
r the distance of the point from the optical axis z
$C = 1/R_1$ with $R_1$: the radius of curvature of the surface in the apex $S_1$
K: the conic section coefficient
$a_4$ respective $a_6$: the coefficients for the additional terms
Whereby the individual criteria have the following values:
$R_1 = 54.7$ mm
$K = -0.6$
$a_4 = -0.3 \times 1^{-6}$
$a_6 = -0.1612 \times 10^{-8}$ The surface facing the eye 2 is a spherical surface with a radius of $R_2 = 175$ mm.

A diameter of 66 mm and a peripheral thickness of $d_r = 1.0$ mm results in a center thickenss of 5.80 mm. This center thickness is approximately 33% smaller than the center thickness of presently fabricated spherical lenses having a constant refractive index of (n = 1.6 and the same surface facing the eye).

If the aforegoing lens had a constant refractive index of n = 1.60, it would have a spherical power of +8.0 dpt, but unacceptable imaging properties:

FIG. 11a depicts the course of the refraction error R and of the astigmatism S in diopters as a function of the angle of vision for an ophthalmic lens with the above-described design of the surface and a constant refractive index, these errors being defined as in the preferred embodiment 1.

As FIG. 11a indicates an angle of vision of 30° would result in aberration to the order of more than 1 dpt.

FIG. 11b depicts, in the right half, the course of the refractive index on the optical axis, the zero point being in the rear apex of the surface $s_2$. The surfaces having a constant refractive index are spheres, the center of symmetry of which SZ lies at z = −100 mm. Between the lens apexes $S_1$ and $S_2$ (z > 0). the refractive index is constant again on and about the optical axis. The depth of penetration $d_s$ necessary for correcting the optically effective zone up to $\sigma = 45°$ is approximately 5 mm.

Figure 11C:
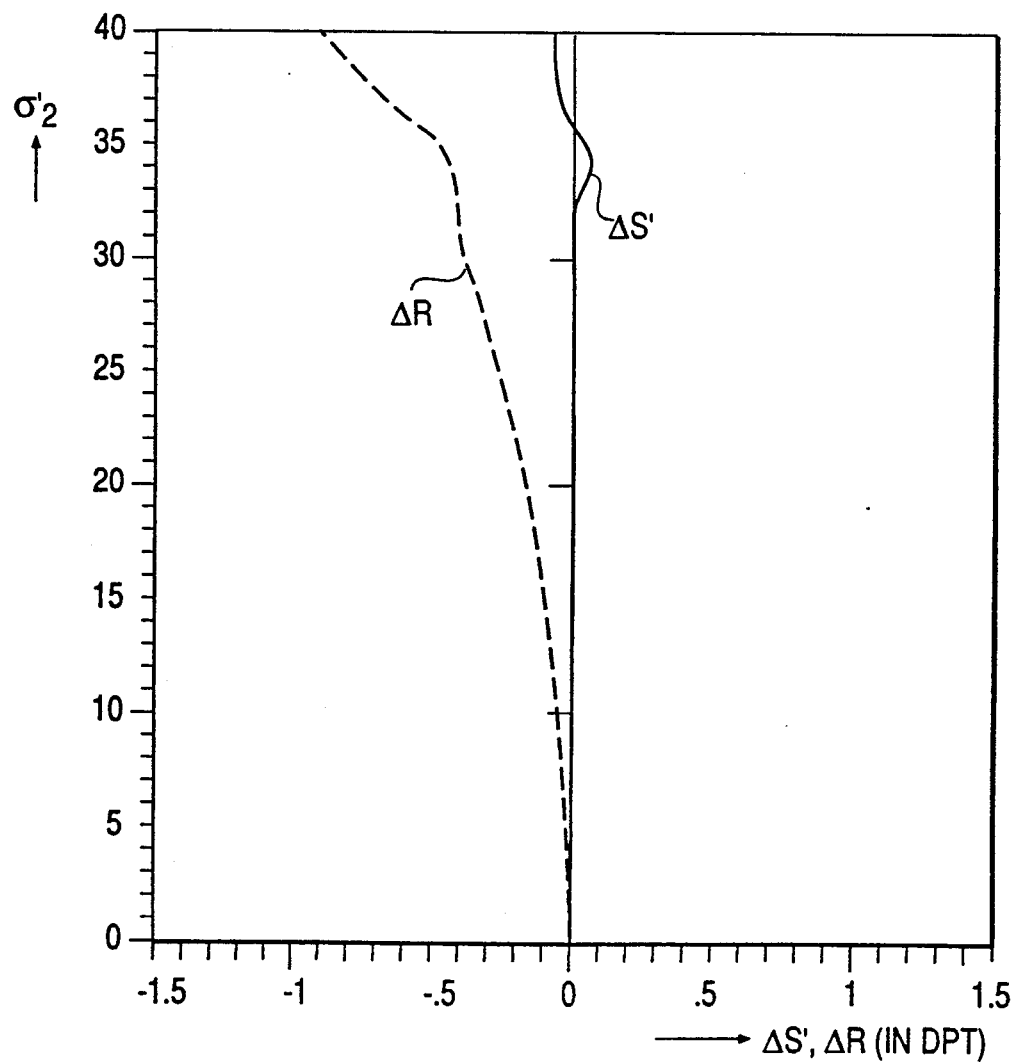

The course of the refraction error R and of the astigmatism S shown in FIG. 11c is yielded by this means. As FIG. 11c indicates, the astigmatism S is practically zero over the entire angle of vision zone, whereas the refraction error has a minor positive value, which does not attain values of −0.5 dpt until at an angle of vision of 25°.

It is expressly pointed out that, due to the invented design, practically any prescribed course can be maintained for the course of one of the two aberrations. In particular, other conditions can also be met, by way of illustration, a specific ratio between the refraction error and the astigmatism.

Due to the use of an optically uncorrected bearing rim, the variation of the refractive index and its depth of penetration required for the correction of aberrations is even smaller than in the fifth preferred embodiment, in which the aberrations are corrected right up to the edge.

PREFERRED EMBODIMENT 8

Figure 12A:
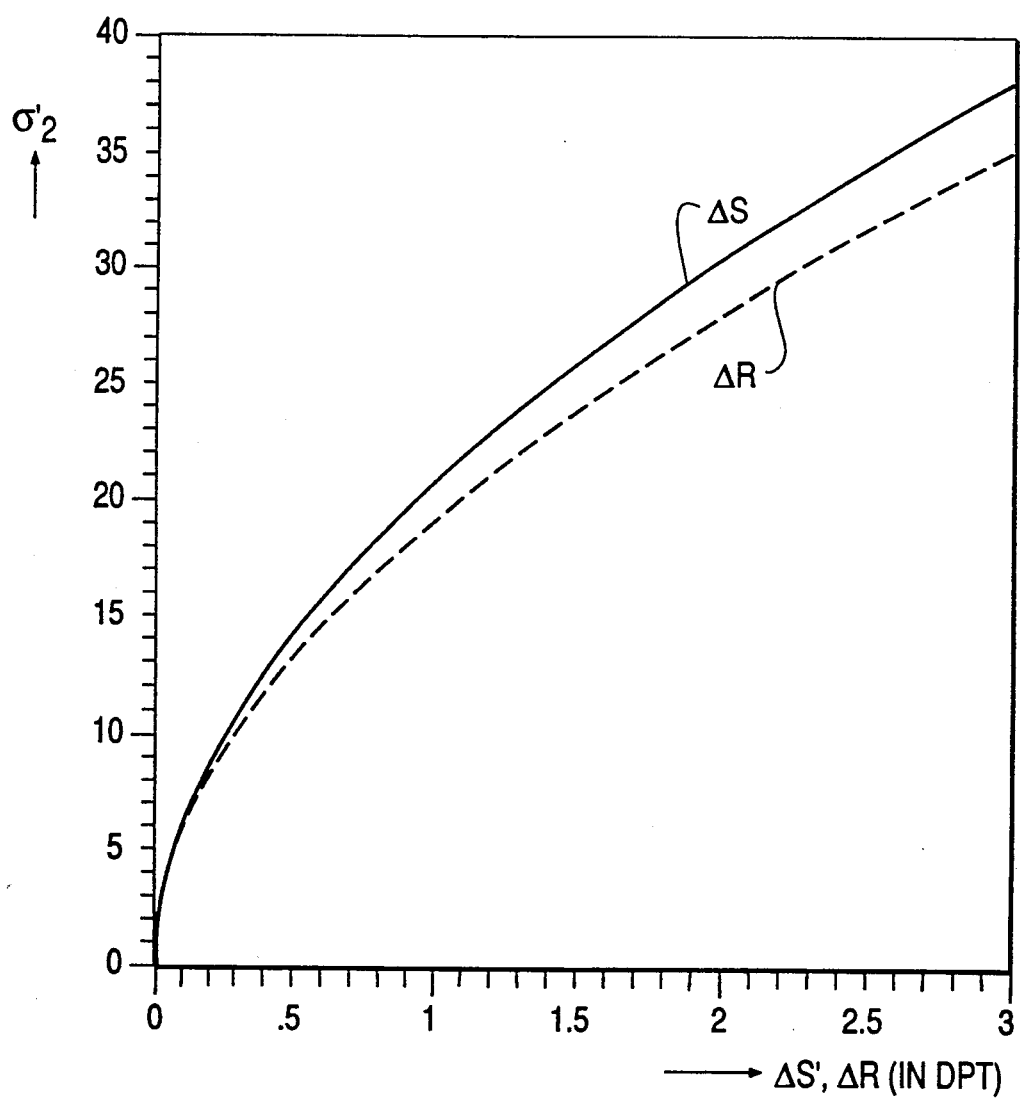
Figure 12B:
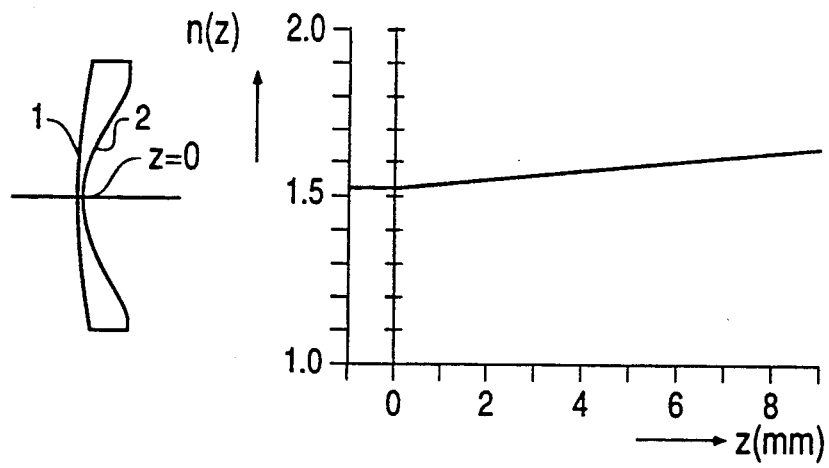

The left half FIG. 12b depicts a lens section of an eighth preferred embodiment of the present invention, in which the designations stand for the same as in FIG. 1 so that it is not necessary to present them again.

In this preferred embodiment, the surface facing the eye 2 is a conicoid surface (conic section), which is modified by additonal elements in such a manner that a "bearing rim" is yielded. In the illustrated preferred embodiment, the sagitta z (=the distance of a point from the apex of the surface $S_2$ in the direction of the z-axis) is yielded by:

$$z = Cr^2/(1+(1-(K+1)C^2r^2)^{1/2}) + a_4 * r^4 + a_6 * r^6$$

with
r: the distance of the point from the optical axis z
$C = 1/R_2$ with $R_2$: the radius of curvature of the surface in the apex $S_2$
K: conic section coefficient
$a_4$ respectively $a_6$: the coefficients of the additional terms.
The individual criteria having the following values:
$R_2 = 43.75$
$K = -0.5$
$a_4 = -1.5 \times 10^{-6}$
$a_6 = -0.283 \times 10^{-8}$ The front surface 1 is a spherical surface having a radius of $R_1 = 262.5$ mm.

A diameter of 66 mm and a center thickness of $d_m = 1.0$ mm results in a peripheral thickness of 6.97 mm. This peripheral thickness is approximately 50% smaller than that of presently fabricated spherical lenses having a constant refractive index.

If the aforegoing lens had a constant refractive index of n = 1.525, it would have a spherical power of $S'_o = -10.0$ dpt, but with unacceptable imaging properties:

FIG. 12a shows the course of the refractive error R and of the astigmatism S in diopters as a function of the angle of vision $\sigma'$ for an ophthalmic lens with the above-described design of the surface and a constant refractive index, these errors being defined by the equations (1) and (2).

As FIG. 12a indicates, an angle of vison of 30° would result in aberrations to the magnitude of 2 dpt and more.

The right half of FIG. 12b depicts the course of the refractive index on the optical axis, the zero pont being in the rear apex of the surface $S_2$. The surfaces having a constant refractive index are spheres, the symmetrical center of which SZ lies at z = −200 mm. Between the lens apexes $S_1$ and $S_2$ (z < 0), the refractive index is constant again on and about the optical axis. The depth of penetration $d_s$ necessary for correcting the optically effective zone up to $\sigma \approx 45°$ is 6 mm.

Figure 12C:
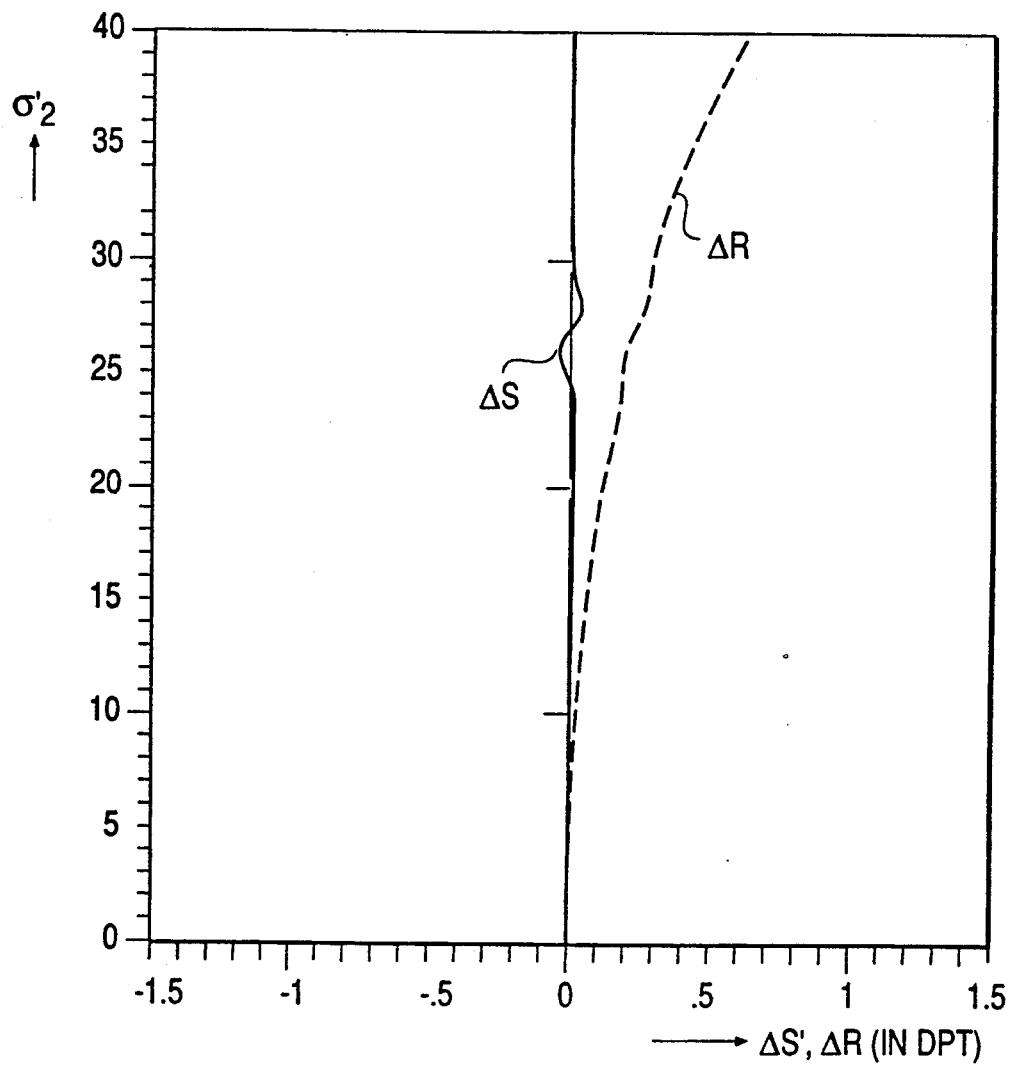

The course of the refraction error R and of the astigmatism S shown in FIG. 12c are yielded by this means. As FIG. 12c indicates the astigmatism S is practically zero over the entire angle of vision zone, whereas the refraction error has a minor positive value, which does not attain values of +0.5 dpt until at an angle of vision of 25°.

It is expressly pointed out that, due to the invented design, practically any prescribed course can be maintained for the course of one of the two aberrations. In particular, other conditions can also be met, by way of illustration, a specific ratio between the refraction error and the astigmatism.

Due to the use of an optically uncorrected bearing rim, the variation of the refractive index and its depth of penetration required for the correction of aberrations is even smaller than in the second preferred embodiment, in which the aberrations are corrected right up to the edge.

Gradient-generating Surface: (A)toric Surfaces

In the previously described preferred embodiments, the invented variation of the refractive index was ulitized, in conjunction with an especially selected design of the surface, for reducing aberrations in uniform strength lenses and/or for reducing the center thickness. As already explained in the introductory section hereto, the gradients, however, may also be ultilized for generating an astigmatic and/or progressive refractive power, with the design of the surface not contributing or only partially contributing to the astigmatic and/or progressive refractive power.

PREFERRED EMBODIMENT 9

For this possible application of the invented variation of the refractive index, an embodiment, in which an astigmatic power, i.e. a cylindrical power, is generated by the variation of the refractive index, shall be elucidated, by way of illustration, in the following section. In this case, the boundary surfaces 1 and 2 (cf. FIG. 1) of the ophthalmic lens are rotationally symmetrical surfaces and, therefore, do not contribute to the astigmatic power. The ophthalmic lens should have a spherical power of 4.00 dpt and a cylindrical power of 1.5 dpt with an axis of 0° TABO (hereinafter referred to as "horizontal" without any intention of limiting the overall scope of the inventive concept).

The invented ophthalmic lens with astigmatic power has a spherical front surface 1 with a radius of $R_1 = 76.8$ mm and a spherical surface facing the eye 2 having a radius of $R_2 = 175$ mm. With a diameter of 66 mm and a (constant) peripheral thickness of 1 mm, the invented ophthalmic lens consequently has a center thickness of 5.3 mm.

The surfaces having a constant refractive index are parallel surfaces of the gradient-generating surface 4 set forth numerically in the following section, the apex of which touches the surface facing the eye 2 in its apex. The vertical meridian section of this surface is the so-called critical section and is a curve of a higher order. The horizontal meridian section is a circle with a radius of 175 mm, i.e. with the same radius as the surface facing the eye 2. It is expressly pointed out that in this context the terms "vertical" and "horizontal" are solely used for the purpose of clarity and that when the ophthalmic lens is in use these are arranged accordingly before the eye according to the eye astigmatism to be corrected. In the following Table 3, the sagitta z (in mm) of the gradient-generating surface 4 is given with reference to the system of coordinates defined in FIG. 1, the zero point of which coincides with the apex of the gradient-generating surface in this preferred embodiment.

TABLE 3

| y/x = | 0 | 4 | 8 | 12 | 16 | 20 |
|---|---|---|---|---|---|---|
| 0 | 0.000 | 0.046 | 0.183 | 0.412 | 0.733 | 1.147 |
| 4 | 0.086 | 0.132 | 0.269 | 0.498 | 0.820 | 1.233 |
| 8 | 0.349 | 0.395 | 0.763 | 0.763 | 1.087 | 1.504 |
| 12 | 0.800 | 0.847 | 0.990 | 1.227 | 1.560 | 1.990 |
| 16 | 1.475 | 1.526 | 1.680 | 1.937 | 2.297 | 2.763 |
| 20 | 2.488 | 2.547 | 2.727 | 3.028 | 3.451 | 3.999 |

Employed as an optimizing condition was the fact that both the astigmatic error and the refraction error are zero in the vertical section, the refraction error R being defined as (mean power$_{actual}$ − mean power$_{nominal}$) and the astigmatism S as the deviation from the prescription values (-astigmatism).

The non-uniform layer, i.e. the layer within which the refractive index changes, has a thickness $d_s$ of 4.0 mm (cf. FIG. 1), with the refractive index decreasing parabolically from 1.825 to 1.525 along the surface normal of the gradient-generating surface.

Figure 13A:
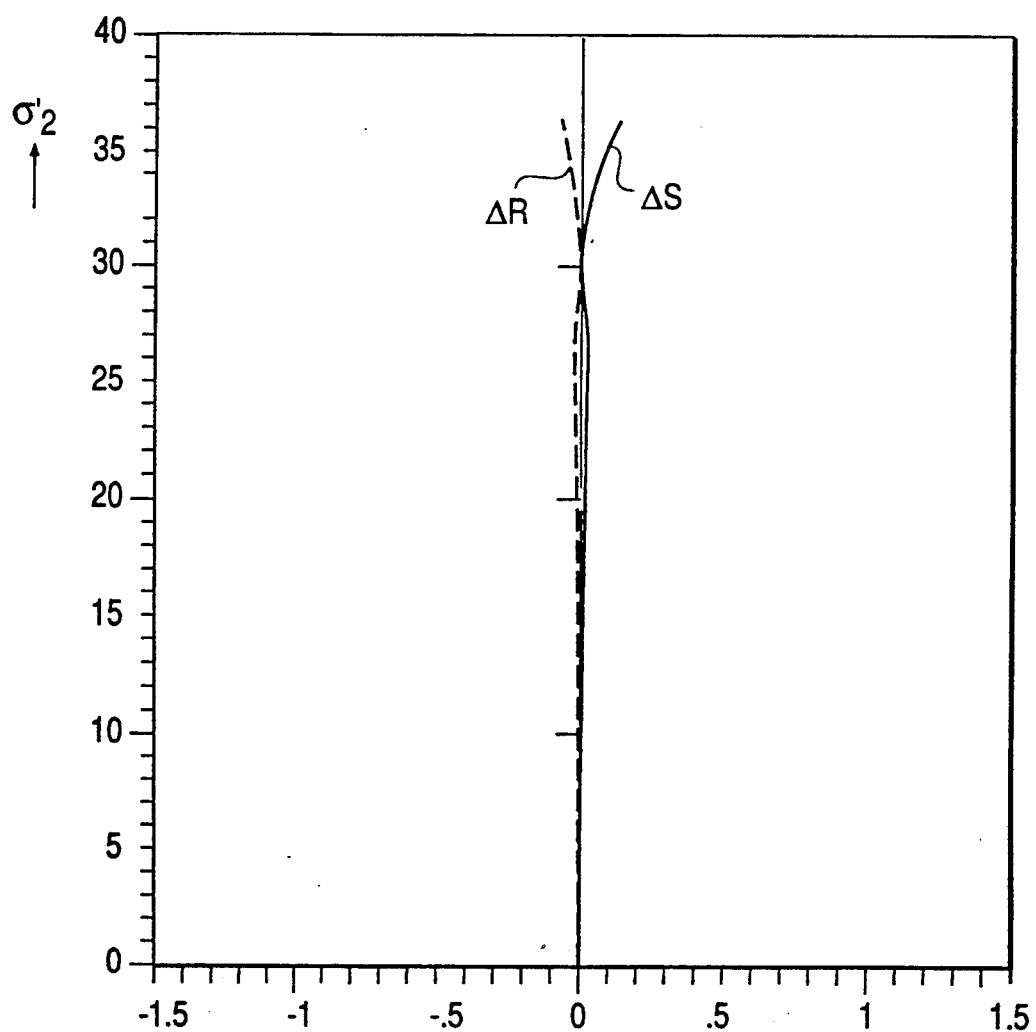
Figure 13B:
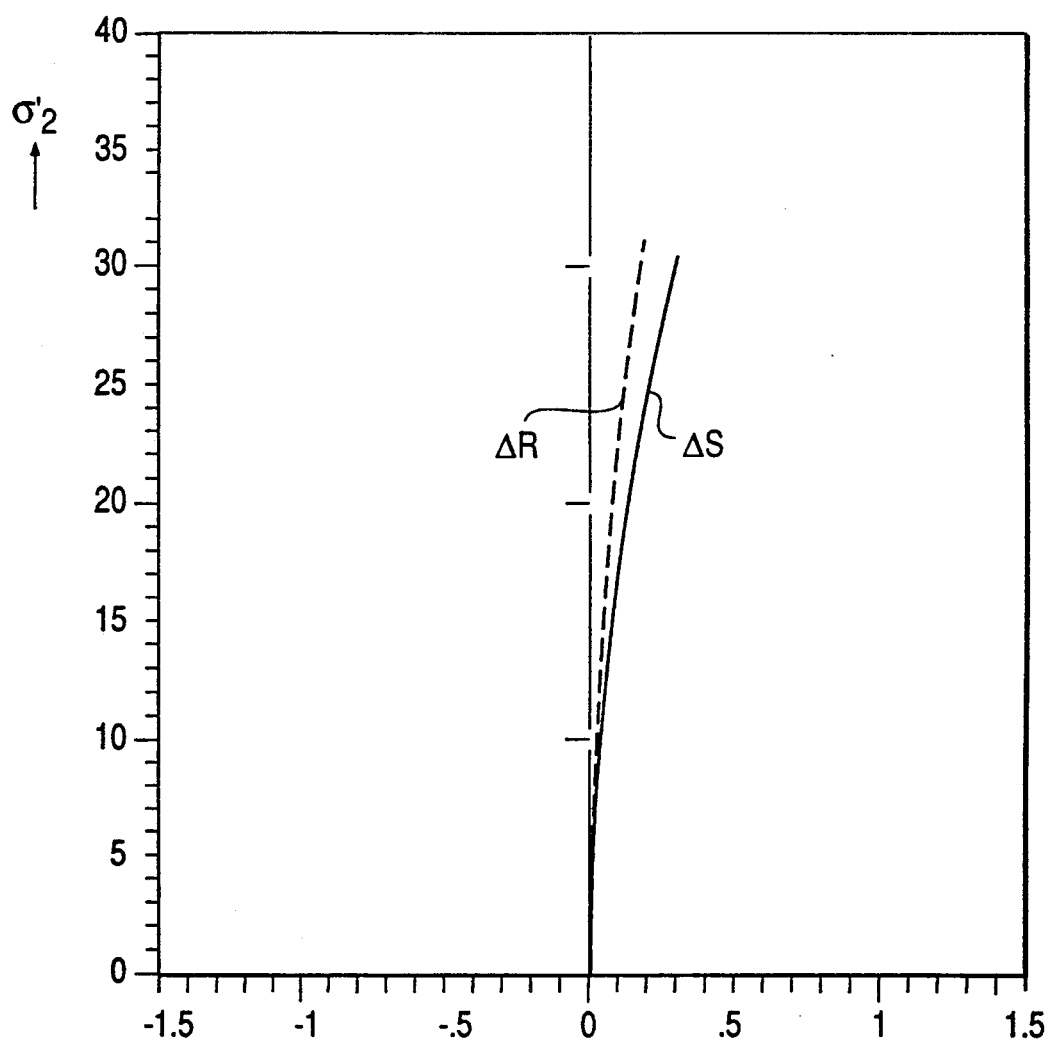

FIG. 13a depicts the resulting refracton error R (dashed line) and the astigmatism S (solid line) along a "vertical meridian", whereas FIG. 13b shows this size along the horizontal meridian. As is indicated, the optimizing condition for two criteria can be met along the (critical) vertical meridian although at disposal is only one critera to be varied. Along the horizontal meridian as well only minor aberrations result although the entire astigmatic power is produced by the variation of the refractive index and not the design of the surfaces, which—as explained in the preceding section—are rotationally symmetrical surfaces.

Figure 14A:
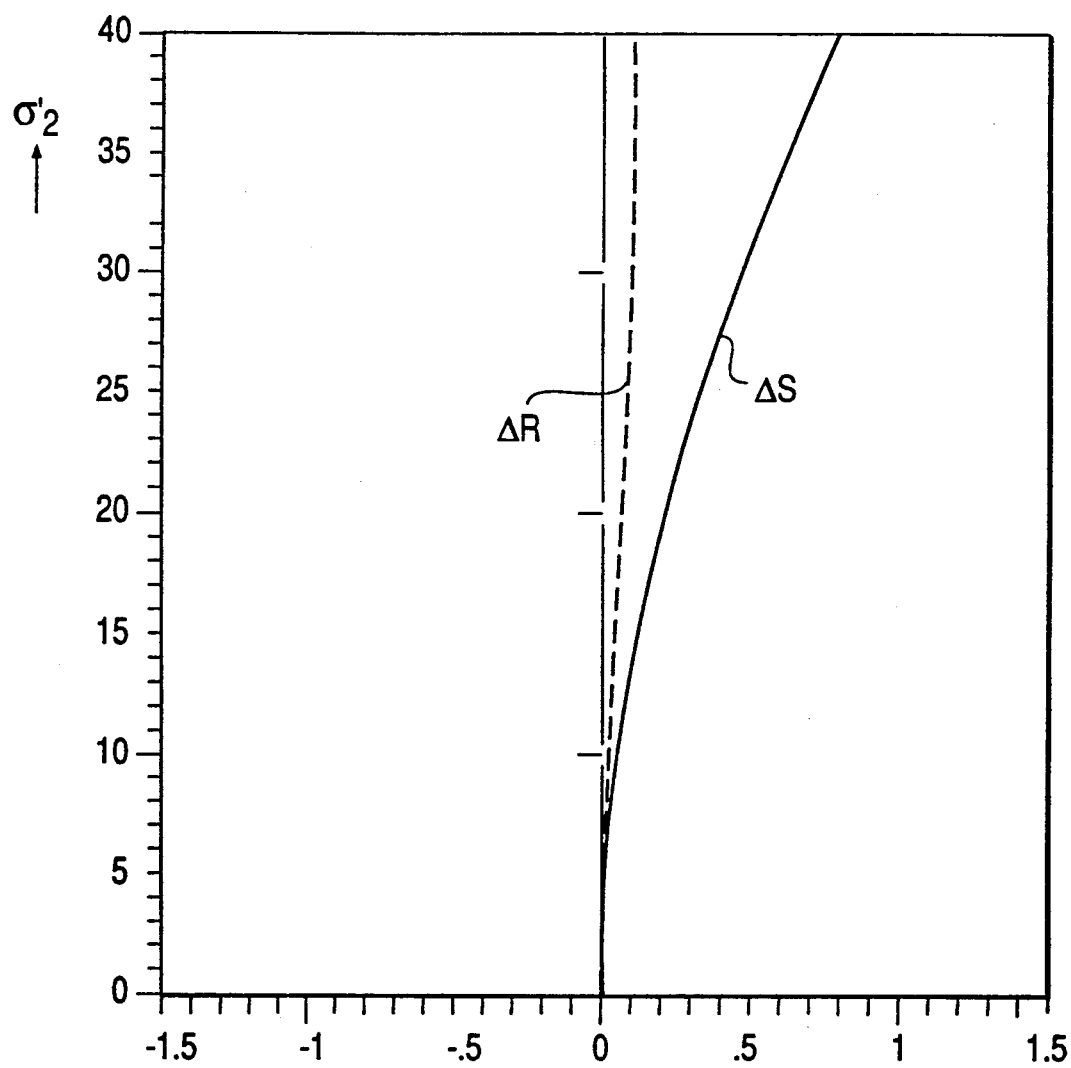
Figure 14B:
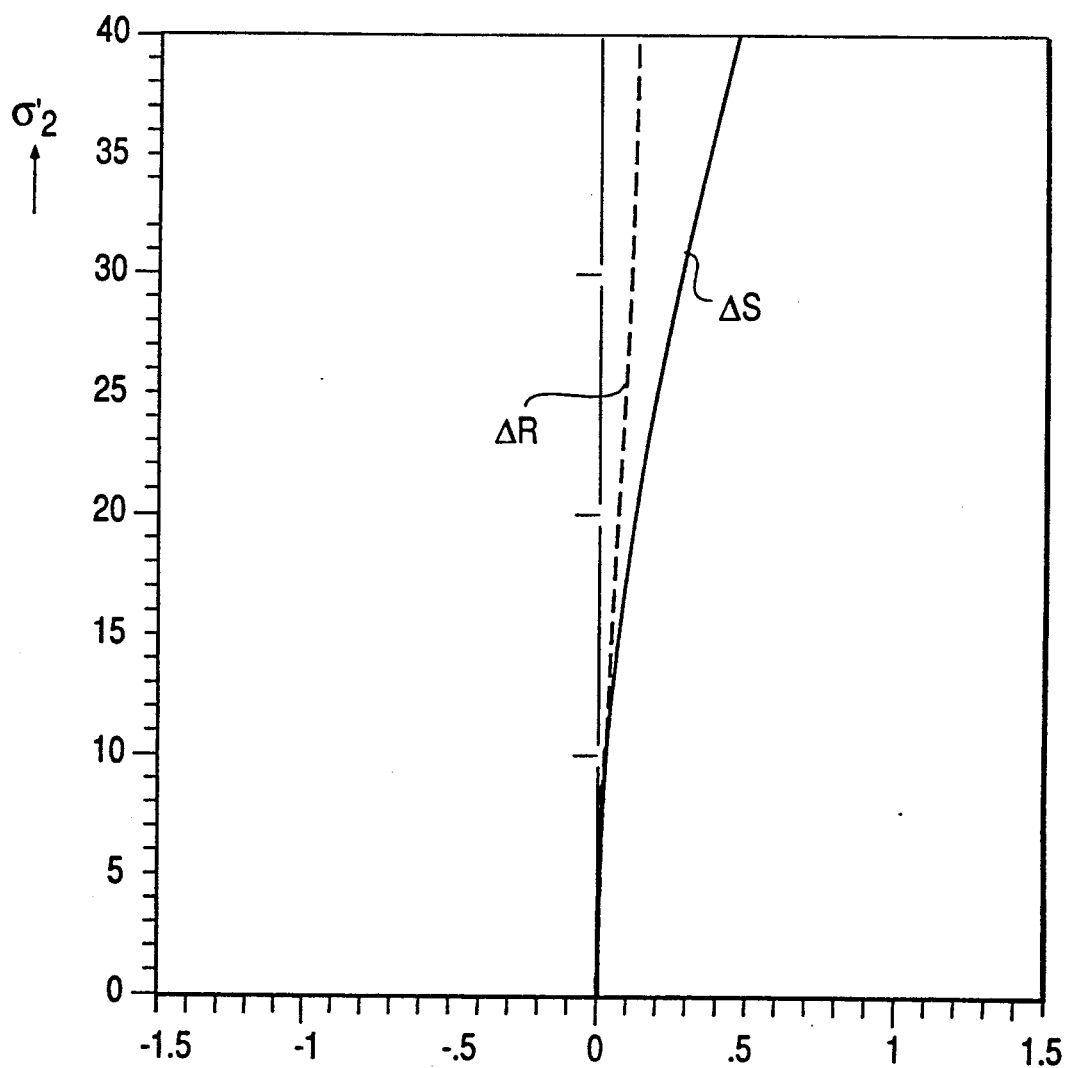

FIGS. 14a and 14b depict the respective criteria for a conventional toric lens having a toric front surface with a horizontal radius of 77.4 mm and a vertical radius of 64.18 mm and a same interior surface as the, by way of illustration. previously shown invented ophthamalic lens. With a constant refractive index n=1.525, the interior surface, thus, has a power of −3 dpt. The spherical power of this lens is, therefore, 4.00 dpt, the cylindrical power 1.5 dpt with an axis of 0° TABO.

If the diameter is 66 mm and the minimum (vertical) peripheral thickness is 1.0 mm, the peripheral surface attains a maximum value of 2.7 mm in the horizontal section. The resulting center thickness is 7.0 mm.

Consequently, in the case of comparable aberrations in conventional lenses, the invented lens has the advantage that the peripheral thickness is constant. This is especially advantageous when utilizing the ophthalmic lens in fashionable frames. Moreover, the center thickness is approximately 28% less. Furthermore, the invented lens has a smaller apex depth than conventional lenses with a toric surface design.

In the preceding section the present invention has been described using numerical preferred embodiments without the intention of limiting the scope of the overall inventive concept. On the basis of the description of the numerical preferred embodiments, an expert in the field is able to calculate the preferred embodiment adapted to each case of application including the case of application when the variation of the refractive index is to be employed for reducing the critical thickness or in which the variation of the refractive index is to serve to reduce the aberrations as well as for a combination of the two. Suitable calculation processes are given, by way of illustration in, DE-OS 36 16 888.

By way of illustration, in order to calculate it can be proceeded as follows:

Due to the fabrication process for the variation of the refractive index, by way of illustration the ion-exchange process for a specific glass or plastic material, the variation of the refractive index along the surface normal is prescibed for each gradient-generating surface employed. Accordingly, at disposal as "degrees of freedom" in optimizing the ophthmaic lens are:

The design of both boundary surfaces of the ophthalmic lens, thus the front surface 1 and the surface facing the eye 2 including the design of one or both gradient-generating surfaces 3, respectively 4.

By way of illustration, it can be proceeded in such a manner that first a design of the front surface 1 and/or of the surface facing the eye 2 is selected resulting in the desired reduction of the critical thickness $d_m$, respectively $d_r$. The boundary surfaces may be selected solely from the aspect of reducing the critical thickness or also the additional aspect of an already more or less large reduction of aberrations. For this purpose, by way of illustration, reference is made to aspherical ophthalmic lenses having a reduced center thickness of the applicant of the present patent application.

After the surface design of the boundary surfaces of the subsequent ophthalmic lens has been fixed "in a first approximation", the resulting aberrations are optimized, thus the astigmatic error and the refraction error by means of variation of the design of the gradient-generating surface 4.

In the event that the gradient-generating surfaces have to be limited for fabricating reasons to spherical surfaces, the curvature of these surfaces, thus the criteria $SZ_2$, is at disposal as a variation parameter.

In this case, it must be taken into account that a decrease in curvature, thus an increase in the distance of the object-side center of symmetry SZ from the origin of coordinates leads to a decrease in the required depth of penetration.

In many cases, by this means a satisfactory correction of the aberrations compared to a reference lens having a constant refractive index may be possible with the selection of a flatter base curve for reducing the apex depth, respectively the intended decrease in critical thickness for a specific apex refractive power, by way of illustration by means of raising the apex refractive power.

If with a prescribed gradient course, still no satisfactory correction of aberrations is possible by means of a variation of the gradient-generating surface 4, in a subsequent step the asperical surface can be varied accordingly. By way of illustration, a conic-section surface "modified" with elements of a higher magnitude may be utilized instead of a pure conic-section surface.

Usually, this "iteration step" suffices at the latest in order to obtain an ophthalmic lens according to the prescribed properties.

The foregoing description is an exemplary presentation of a possible mode of procedure. Deviation from this mode is naturally possible in calculating invented ophthalmic lenses. Instead of spherical gradient-generating surfaces whose curvature is varied, by way of illustration, aspherical surface can be employed or the mode of proceeding may be differed in iteration between the variation of the boundary surfaces of the ophthalmic lens and the variation of the design of the gradient-generating surfaces.

In any event, however, due to the invented design not only ophthalmic lenses having constant refractive power or ophthalmic lenses having astigmatic power, but also ophthalmic lenses having progressive and, if required, also astigmatic power can be realized, which entirely or partially are produced by the variation of the refractive index or in which the correction of the aberrations entirely or partially occurs due to the variation of the refractive index, whereby the respective required variation of the refractive index may be attained by means of the invented concept of gradient-generating surfaces in conjunction with, as such, known fabricating processes.

Furthermore, the overall inventive idea may be applied to ophthalmic lenses made of any desired material and with any desired surface design. Therefore, it is not necessary that the "initial" refractive index has a value of 1.525. Depending on the base material, the refractive index may, naturally, be lower—by way of illustration 1.5 in the case of specific plastic materials—or higher and have, by way of illustration, values of 1.6 or 1.7 (typical values for high index lenses and plastic materials). It is also not necessary that a conic-section surface is employed as the aspherical surface. Complex aspherical surfaces, in particular, already also contributing to the correction of image errors due to their surface design may, of course, also be used. Furthermore, both surfaces may be designed as aspherical surfaces and/or the front surface may have cyclindrical power.

Moreover, it is naturally not necessary that the correction condition "astigmatism over the angle of vision zone approximated =0" always be met. Depending on the case of application or prescription, other correction conditions, by way of illustration, the condition "absolute value of the refraction error/absolute value of the astigmatism =2:1" may be met.

In any event, the invented teaching, that the refractive index must increase if the error to be corrected has too great positive values, respectively must decrease if the error to be corrected (astigmatism or refraction errors) have "too great" negative values.

What is claimed is:

1. An ophthalmic lens having a front concave surface and an eye-facing concave surface and a varying refractive index for enabling correction of aberrations including astigmatism, comprising at least one system of parallel surfaces at given levels $(n,(x,y,z)=\text{const.})$ having a constant refractive index, which are spaced the same distance at all points in a direction normal to the parallel surfaces, and which, respectively extend so as to intersect the axis connecting lens apexes $(S_1, S_2)$ of the front surface and the eye-facing surface at a distance A from the next lens apex, for which the following equation is valid:

$$A \leq 20^* \ L_{n(x,y,z)=const.}$$

$L_{n(x,y,z)=const.}$ being the length of a boundary line in a lens section between a zone having constant refractive power and a zone having varying refractive power.

2. An ophthalmic lens according to claim 1, wherein said systems of surfaces at given levels intersect said axis (z) in a vertical direction.

3. An ophthalmic lens according to claim 1 or 2, wherein said systems of surfaces at given levels are parallel surfaces to toric or atoric surfaces.

4. An ophthalmic lens according to claim 1 or 2, wherein said systems of surfaces at given levels are parallel surfaces to a surface having a shape similar to the shape of the surfaces contributing to a rise in refractive power of progressive ophthalmic lenses.

5. An ophthalmic lens according to claim 1 or 2, wherein said surfaces at a given level are rotationally symmetrical surfaces, which have a common evolute in a meridian section.

6. An ophthalmic lens according to claim 5, wherein said rotationally symmetrical surfaces at given levels are spherical surfaces.

7. An ophthalmic lens according to claim 6, wherein said surfaces at given levels are planes.

8. An ophthalmic lens according to claim 7, wherein only the change in refractive index for $z \geq 0$, $z=0$ being the apex ($S_2$) of the eye-facing surface, serves to correct the abberrations.

9. An ophthalmic lens according to claim 8, wherein, in order to correct at least one of astigmatism and refraction errors, said refractive index for $z \geq 0$ increases if the astigmatism values, respectively refraction error values, are positive when the surface design is the same and the refractive index is constant, and decrease if the astigmatism values, respectively the refraction error values are negative.

10. An ophthalmic lens according to claim 1, wherein, in order to correct aberrations, said surfaces at given levels having in each case a constant refractive index intersect said connecting axis (z) beyond both apexes of said ophthalmic lens.

11. An ophthalmic lens according to claim 5, wherein the starting point of said evolute for said surfaces at given levels $n(x,y,z)=$ const. having a constant refractive index lie in an object space.

12. An ophthalmic lens according to claim 5, wherein said refractive index increases on the image side toward the eye in order to correct at least one of a positive astigmatism value and a positive refraction error, respectively and decreases in order to correct at least one of a negative astigmatism value, respectively refraction error.

13. An ophthalmic lens according to one of the claim 1, wherein the course of both boundary surfaces is selected in such a manner that the critical thickness ($d_m$) respectively ($d_r$) of said ophthalmic lens does not exceed a prescribed value.

14. An ophthalmic lens according to claim 1, wherein, in order to reduce an apex depth of the lens, said refractive index changes on said connecting axis of said apexes ($S_1$, $S_2$) of said ophthalmic lens.

15. An ophthalmic lens according to claim 13, wherein at least one of said boundary surfaces is an aspherical surface.

16. An ophthalmic lens according to claim 13, wherein said boundary surfaces are rotationally symmetrical surfaces so that said axis (z) connecting said lens apexes ($S_1$, $S_2$) is the optical axis.

17. An ophthalmic lens according to claim 16 wherein, in order to reduce said critical thickness of said ophthalmic lens, said refractive index changes on the optical axis between said apex $S_1$ ($z=-d_m$) of said front surface and said apex $S_2$ ($z=0$) of said eye-facing surface in such a manner that its greatest value is on the side with the more curved surface.

18. An ophthalmic lens having positive refracting power according to claim 15, wherein said aspherical surface is said front surface.

19. An ophthalmic lens having negative refracting power according to claim 15, wherein said aspherical surface is said eye-facing surface.

20. An ophthalmic lens according to claim 16 wherein said refractive index has a constant value in a limited zone about the optical axis.

21. An ophthalmic lens according to claim 1, wherein the peripheral zone of the lens is designed as an optically not correcting bearing rim.

* * * * *